United States Patent
Takahashi et al.

(10) Patent No.: US 7,406,611 B2
(45) Date of Patent: Jul. 29, 2008

(54) OUTPUT SYSTEM, DEVICE MANAGEMENT APPARATUS AND PROGRAM, AND OUTPUT METHOD

(75) Inventors: Yusuke Takahashi, Suwa (JP); Mikio Aoki, Suwa (JP)

(73) Assignee: Seiko Epson Corporation (JP)

( * ) Notice: Subject to any disclaimer, the term of this patent is extended or adjusted under 35 U.S.C. 154(b) by 414 days.

(21) Appl. No.: 11/297,777

(22) Filed: Dec. 8, 2005

(65) Prior Publication Data

US 2006/0200704 A1    Sep. 7, 2006

(30) Foreign Application Priority Data

Mar. 1, 2005   (JP)   ............................. 2005-055436
Aug. 31, 2005  (JP)   ............................. 2005-251675

(51) Int. Cl.
    *G06F 1/26* (2006.01)
(52) U.S. Cl. .................. 713/300; 713/320; 713/323; 358/1.14; 358/421
(58) Field of Classification Search ................. 713/300, 713/323
    See application file for complete search history.

(56) References Cited

U.S. PATENT DOCUMENTS 5,528,346 A    6/1996    Kim et al.

2002/0054316 A1    5/2002    Abe
2003/0107761 A1    6/2003    Kimura

FOREIGN PATENT DOCUMENTS

| CN | 1121595 | 5/1996 |
|----|---------|--------|
| EP | 1 107 104 | 6/2001 |
| JP | 6-103008 | 4/1994 |
| JP | 2004-272596 | 9/2004 |
| JP | 2004-362432 | 12/2004 |

*Primary Examiner*—Nitin C. Patel
(74) *Attorney, Agent, or Firm*—Harness, Dickey & Pierce, P.L.C.

(57) ABSTRACT

An output system including an output data storage section storing output data, an output data saving section saving the output data to the storage section, an authentication information acquiring section acquiring authentication information, a usability determining section determining usability of the output data depending on acquired authentication information, a power control section controlling power to the network device, an output data transmitting section sending, to the network device, usable output data, and a power-save switchover section switching between an operating status and a power-save status. The power control section forwarding, to the power-save switchover section, a power-save cancel command for transition into the operating status after the output data is determined usable and before the transmitting section sends the output data.

22 Claims, 16 Drawing Sheets

| | | |
|---|---|---|
| 402 | USER ID | takahashi |
| 404 | DOCUMENT DATA NAME | minute.doc |
| 406 | TERMINAL INFORMATION | 192.168.0.93 |
| 408 | PRINT DATE/HOUR | 2004.01.05 14:30:06 |
| 410 | PRINT SETTING | (OMITTED) |

| JOB ID | USER ID | PRINT DATA NAME | PRINT COUNT | OTHER PIECES OF PRINT ATTRIBUTE INFORMATION | |
|---|---|---|---|---|---|
| 1 | takahashi | 0001.prn | 1 | . . . | . . . |
| 2 | sato | 0002.prn | 2 | . . . | . . . |
| 4 | tanaka | 0004.prn | 0 | . . . | . . . |
| 6 | takahashi | 0006.prn | 0 | . . . | . . . |

| USER ID | PASSWORD |
|---|---|
| Takahashi | * * * * * |
| Sato | * * * * * |
| Tanaka | * * * * * |
| Suzuki | * * * * * |

OUTPUT SYSTEM, DEVICE MANAGEMENT APPARATUS AND PROGRAM, AND OUTPUT METHOD

RELATED APPLICATIONS

This application claims priority to Japanese Patent Application Nos. 2005-055436 file Mar. 1, 2005 and 2005-251675 filed Aug. 31, 2005 which are hereby expressly incorporated by reference herein in their entirety.

BACKGROUND

1. Technical Field

The present invention relates to a system, apparatus, program and method that output is available at a network device with a power save mode, and more particularly to an output system, a device management apparatus and program, output method and printing system that are suited to reduce the power consumption in an authentication output system without increasing the time up to the start of an output.

2. Related Art

As a printing system having a security function, there is known an authentication printing system wherein a user authentication apparatus is provided nearby a network printer so that printing can be started at the network printer when the user sends print data from the host terminal to the user authentication apparatus and then swipes an authentication card in the user authentication apparatus.

In the existing authentication printing system, when the network printer is in a power save status, the network printer remains in a power save status for the duration before delivering print data to an interpreter for the network printer. In such a case, a delay is encountered in starting a printing by the time required for the warming up process. The user is required to wait for the start/completion of printing. Meanwhile, in order to maintain the warm-up status for swiftly staring a printing, a constant amount of power consumption is needed which imposes a burden economically/environmentally.

JP-A-2004-272596 discloses an art wherein a printing is to be started swiftly at a network printer with a power save mode. The invention described in JP-A-2004-272596 is that, when pushing a remote output button provided on a print setting/operation panel, a warm-up command is sent to a previously registered network printer thereby warming up the network printer.

However, where applying the invention described in JP-A-2004-272596 to an authentication printing system, the following problem arises.

In the authentication printing system, because print data is held in the user authentication apparatus, there is a case that printing is not immediately done after a user's transmission of print data from the host terminal but printing is executed by providing a user authentication after the passage of a certain time. Accordingly, even in case the network printer is warmed up during operating the print set/operation panel at the host terminal as in the invention described in JP-A-2004-272596, power is uselessly consumed in case a long time is taken upon providing a user authentication from a sending of print data.

Meanwhile, in recent years, the information processing apparatus, home electrical appliance, or the like is configured to reduce power consumption under the environmental standard, such as International Energy Program, to automatically briefly suspend the apparatus function where the apparatus is out of use for a constant time after the use thereof.

However, in case the warm-up status is maintained for a constant time after completing the printing as above also on the network printer for use in an authentication printing system, a readily printable status is to be maintained despite the appearance that no print output is to be done. This correspondingly consumes power thus imposing a burden economically/environmentally.

Such a problem is not limited to printing at the network printer but can be thought likewise in the case that a display device, such as a projector or an LCD (liquid crystal display), is connected to a network so that display can be effected on the display device.

SUMMARY

Therefore, an advantage of some aspects of the invention to provide, in an authentication output system, an output system, device management apparatus and program and output method which is suited for reducing power consumption without increasing the time up to the start of an output.

According to form 1 of the present invention, there is provided an output system having a network device for performing an output depending upon output data, the network device being allowed to perform an outputting upon obtaining an authentication, the output system comprising: an output data storage section that stores the output data; an output data saving section that saves the output data to the output data storage section; an authentication information acquiring section that acquires authentication information; a usability determining section that determines a usability of the output data depending on authentication information acquired at the authentication information acquiring section; a power control section for controlling a power to the network device; an output data transmitting section that sends, to the network device, output data which the usability determining section determined usable of among the output data of the output data storage section; and a power-save switchover section that switches over between an operating status as a power-consuming status allowing the output at the network device and a power-save status as a status lower in consuming power than the operating status; the power control section being to forward, to the power-save switchover section, a power-save cancel command for transition into the operating status after the usability determining section determines the output data to be usable and before the output data transmitting section sends the output data.

With this structure, the output data saving section stores output data in the output data storage section. In case authentication information is acquired at the authentication information acquiring section, the usability determining section determines a usability of the output data depending upon the acquired authentication information.

When determined usable, the output data transmitting section sends the output data of the output data storage section to the network device.

Meanwhile, the power control section sends a power-save cancel command to the power-save switchover section after the output data is determined to be usable and before sending of output data.

When there is an input of a power-save cancel command, the power-save switchover section causes the network device to transit into an operating status thus placing it in a status for making an output. The network device in that status, when receiving output data, makes an output based on the received output data.

Due to this, the network device is canceled of the power-save status after an authentication. Accordingly, even in case the user takes a time from sending of an output data up to completing an authentication, the power-save status is maintained in that duration. Meanwhile, because the power-save status is canceled before receiving output data, an outputting can be started without requiring a significant time. Therefore, it is possible to obtain an effect that power consumption can be reduced as compared to the existing one without increasing the time up to an outputting start.

Here, the operating status may be a status in a mode called a standby mode for the usual printer. In this mode, the printer is in a status (e.g. warmed-up status) minimized (different depending upon printer performance) in the time (wait time) of from print data reception to a printing (image forming) start. This is true for the output system in form 2, the device management apparatus in form 16, the device management program in form 29 and the output method in forms 42 and 43.

Meanwhile, the power-save status may be a status in a mode called a sleep mode, low-power mode or so for the usual printer. In this mode, the printer is in a minimal power consumption status (in some models, two stages of power save mode (e.g. (preheat-up mode, save power mode) are provided) in which mode it transits into an operating status when receiving print data. Consequently, in the power-save status, there is a need of a time for warming up or so in order for transitioning into an operating status for executing a printing in a minimal time. This correspondingly requires the longer wait time of from a print data reception up to a printing start than that in the operating status.

Meanwhile, the power-save status includes a status that a network device is operated in a low-power consumption status required for data reception check during a wait time no reception is made as to output data such as print data in the network device. Besides, a status is included that a power consumption required in outputting is reduced, e.g. decreasing the outputting rate or lowering the output result quality. This is true for the output system in form 2, the device management apparatus in form 16, the device management program in form 29 and the output method in forms 42 and 43.

Meanwhile, authentication information is information that places a relation between a user and output data, e.g. a structure that the information specifying a user individuality is included in output data and an authentication card, a structure assigning an identifiers for identifying a user for each of output data, a structure in combination of those. Furthermore, by including the information (password, or the like) for confirming an authenticated user himself/herself, security can be improved. This is true for the output system in form 2, the device management apparatus in form 16, the device management program in form 29 and the output method in forms 42 and 43.

Meanwhile, "forwarding" includes "sending" of a command, such as a power-save switch command, to an apparatus having a power-save switchover section through a network, where an apparatus having a power-control section and an apparatus having a power-save switchover section are provided separate and the both are connected with each other through a network such as a LAN (including a wireless LAN), a WAN, or the Internet. For example, where a power control section and a power-save switchover section are within the same apparatus, "outputting" of a command such as a power-save switch command by the power control section to the power-save switchover section is included. This is true for the output system in form 2, the device management apparatus in form 16, the device management program in form 29 and the output method in forms 42 and 43.

Meanwhile, forwarding a power-save cancel command may be in any timing provided that it is after the output data is determined to be usable and before sending of output data. This is true for the output system in form 2, the device management apparatus in form 16, the device management program in form 29 and the output method in forms 42 and 43.

Here, the network device may be in any configuration provided that it is adapted to make an output based on output data. This includes, a network printer for making a printing based on print data, a display device for making a display based on display data, and a sound output device for outputting sound based on audio data. The display device may be a projector, an LCD or the like, for example.

Meanwhile, the present system may be realized as a network system which a network device is communicably connected with other apparatuses, terminals and devices. In this case, the output-data storage section, the output-data saving section, the authentication information acquiring section, the usability determining section and the power control section may belong to any of the network device and other apparatuses/devices.

According to form 2 of the invention, there is provided an output system for communicating between a network device for performing an output depending upon output data and a device management apparatus for managing the network device, the network device being allowed to perform an outputting upon obtaining an authentication, the output system comprising: an output data storage section that stores the output data; an output data saving section that saves the output data to the output data storage section; an authentication information acquiring section that acquires authentication information; a usability determining section that determines a usability of the output data depending upon the authentication information acquired at the authentication information acquiring section; and a power control section for controlling a power to the network device; the device management apparatus having an output data transmitting section that sends, to the network device, output data which the usability determining section determined usable of among the output data of the output data storage section; the network device having an output data receiving section that receives the output data, an output section that performs an output depending upon output data received at the output data receiving section, a power-save switchover section that switches over between an operating status as a power-consuming status allowing the output at the network device and a power-save status as a status to reduce consumed power further than the operating status; the power control section being to forward, to the power-save switchover section, a power-save cancel command for transition into the operating status after the usability determining section determined the output data usable and before the output data transmitting section sends the output data.

With this structure, the output-data saving section saves output data to the print-data storage section. When authentication information is acquired at the authentication information acquiring section, the usability determining section determines a usability of the output data depending upon the acquired authentication information.

At the device management apparatus, when determined usable, the output-data transmitting section sends the output data of the output-data storage section to the network device.

Meanwhile, the power control section forwards a power-save cancel command to the power-save switchover section after the output data is determined to be usable and before sending of output data.

The network device, when inputted with the power-save cancel command, is transited into an operating status by the power-save switchover section thus becoming a status capable of making an output at the output section. In this status, in case output data is received at the output-data receiving section, the output section makes an output based on the received output data.

Due to this, the network device is canceled of the power-save status after an authentication. Even in case the user is required a time of from sending of output data up to completing an authentication, the power-save status is maintained in that duration. Also, because the power-save status is canceled before receiving the output data, an outputting is started without significantly taking a time. Therefore, it is possible to obtain an effect that power consumption can be reduced as compared to the existing one without increasing the time up to an outputting start.

Here, the output section may be in any configuration provided that an output is to be made based on output data. This includes, a print section for making a printing based on print data, a display section for making a display based on display data, or a display section for outputting sound based on audio data. The display section may be a projector or an LCD.

Meanwhile, the present system may be realized as a network system that a network device and a device management apparatus are communicably connected together, or as a network system that other apparatuses, terminals and devices are further connected for communication. In the former case, the output-data storage section, the output-data saving section, the authentication information acquiring section, the usability determining section and the power control section may belong to any of the network device and the device management apparatus. In the latter case, those sections may belong to any of the network device, the device management apparatus and other apparatuses.

Meanwhile, it is possible to conceive, as another configuration in the present system, another configuration 1 that output data is held in a host terminal under control of the user. In this case, the host terminal has at least an output-data storage section, an output-data saving section, and an output-data second transmitting section that sends to the network device the output data instructed for sending, while an authentication terminal for usability determination has at least a usability determining section and an output-data transmission instructing section that makes an instruction to send the output data determined usable by the host terminal and instructed for outputting.

Namely, when issuing an output request at the host terminal, the output data is held in the host terminal. When the user, obtained an authentication at the authentication terminal, selects an output request retained and instructs to output it, the authentication terminal instructs the host terminal holding the output data instructed for output, to send the relevant output data to the network device instructed for output. The host terminal sends the output data instructed for transmission to the network device. The network device, when receiving the output data from the host terminal, performs an outputting.

Meanwhile, it is also possible to conceive, as another configuration that holds output data at a host terminal, another configuration 2 that the output data authenticated and instructed for output is acquired by an authentication terminal and sent to a network device. In this case, the host terminal has at least an output-data storage section and an output-data saving section while the authentication terminal has at least a usability determining section, an output-data acquiring section that acquires from the host terminal the output data determined usable by the host terminal and instructed for output, and an output-data second transmitting section that sends the output data acquired at the output-data acquiring section to a network device the relevant output data is instructed for output.

Namely, when issuing an output request at the host terminal, the output data is held in the host terminal. When the user, obtained an authentication at the authentication terminal, selects an output request retained and instructs to output it, the authentication terminal acquires the output data from the host terminal and sends the acquired output data to the network device instructed for output. The network device, when receiving the output data from the host terminal, performs an outputting.

Meanwhile, it is also possible to conceive, as another configuration in the present system, another configuration 3 that holds output data in a network device. In this case, the network device has at least an output-data storing section, the host terminal has at least an output-data transmitting section, and the authentication terminal has at least an output instructing section that instructs the network device to output the output data determined usable and instructed for output.

Namely, when issuing an output request at the host terminal, the output data is held in the output-data storing section haven by the network device by being sent to the network device or so. When the user, obtained an authentication at the authentication terminal, selects an output request retained and instructs to output it, the output instructing section instructs, for output, the network device holding the output data instructed for output. The network device performs an outputting according to the output-instruction from the authentication terminal.

It is preferable that, in the output system according to form 3 of the invention, the device management apparatus has the output data saving section, the authentication information acquiring section, the usability determining section, and the power control section.

With this structure, in the device management apparatus, the output-data saving section saves the output data to the print-data storage section. When authentication information is acquired at the authentication information acquiring section, the usability determining section determines a usability of the output data depending upon the acquired authentication information. As a result, when determined usable, the output-data transmitting section sends the output data of the output-data storage section to the network device. Meanwhile, the power control section forwards a power-save cancel command to the save-power switchover section after the output data is determined to be usable and before sending of the output data.

This makes it possible to control the power status of the network device, at the device management apparatus. Thus, it is possible to obtain an effect that a plurality of network devices can be collectively controlled as to the power status by a single device management apparatus without providing the network devices with a function to control the power status of the network devices.

It is preferable that, in the output system according to form 4 of the invention, the power control section is to forward the power-save cancel command immediately after the usability determining section determines the output data to be usable.

With this structure, when determined usable, the power control section forwards a power-save cancel command.

This obtains an effect that outputting can be started swiftly because, usually, the power-save status is canceled before the user starts an operation.

Here, "immediately after a determination" is in the timing of forwarding a power-save cancel command with a less passage of time after determined usable, desirably in earlier timing to a possible extent.

It is preferable that, in the output system according to form 5 of the invention, the output data saving section is to save the output data and the authentication information, with correspondence, to the output data storage section, comprising an output data retrieval section that retrieves the output data, corresponding to authentication information acquired in the authentication information acquiring section, from the output data storage section, the power control section being to forward the power-save cancel command when the usability determining section determines the output data to be usable and the output data retrieval section retrieved the output data.

With this structure, when determined usable and the output data concerned is retrieved, the power control section forwards a power-save cancel command.

This obtains an effect that power consumption can be further reduced because the power-save status is canceled only in the case that an authentication is obtained and the output data concerned exists.

It is preferable that, in the output system according to form 6 of the invention, the output data saving section is to save the output data and the authentication information, with correspondence, to the output data storage section, comprising an output data retrieval section that retrieves the output data, corresponding to authentication information acquired in the authentication information acquiring section, from the output data storage section, the power control section being to forward the power-save cancel command when the usability determining section determines the output data to be usable and the output data retrieval section retrieved the output data unprocessed.

With this structure, when determined usable and unprocessed output data is retrieved, the power control section forwards a power-save cancel command. Namely, for example, in a structure that the output data processed for output is left in the print-data storage section wherein re-outputting is available for the same output data, when there is output data not output-processed even once after stored among those of the output data stored in the print-data storage section, a power-save cancel command is forwarded.

This obtains an effect that, because there is a high possibility to carry out an outputting in the case an authentication is obtained and unprocessed output data exists, power consumption can be further reduced by canceling the power-save status limitedly in such a case.

It is preferable that, in the output system according to form 7 of the invention, there is comprised of an output-completion detecting section that detects a completion of an output by the output section, the power control section being to forward, to the power-save switchover section, a power-save transit command for transition into a power-save status when the output completion detecting section detects a completion of the output.

With this structure, when output-completion detecting section detects an output completion, the device management apparatus at its power control section forwards a power-save transit command to the power-save switchover section.

The network device, when inputted with the power-save transit command, is transited into a power-save status by the power switchover section.

This obtains an effect that power consumption can be further reduced because transition is done into a power-save status immediately after a completion of the outputting.

Here, the output-completion detecting section is a section to detect a completion of the outputting executed at the network device. For example, whether the outputting is completed or not can be determined by making an inquiry to an output managing function haven by the network device. Incidentally, the output-data managing function, capable of determining whether or not outputting is completed, is a known function in the usual output device such, as a printer, an LCD and a projector.

It is preferable that, in the output system according to form 8 of the invention, there is comprised of an operation-completion detecting section that detects a completion of an operation for the device management apparatus, the power control section being to forward the power-save transit command when the output completion detecting section detects a completion of the output and the operation-completion detecting section detects a completion of the operation.

With this structure, when the output-completion detecting section detects an output completion and the operation-completion detecting section detects an operation completion, the power control section forwards a power-save transit command.

Namely, even after completing the outputting, an instruction for transition into a power-save status is not issued during user's operation, e.g. displaying a list of output data, selecting and printing those not selected as objects-of-output in the first output-instruction or so.

Due to this, after the output completion, the same user upon again instructing for another output is not required to place the network printer into a status ready to execute an outputting (warming up or so). Thus, it is possible to obtain an effect that the user need not wait for a time of warming up or so, in the duration of from a user's input of output instruction up to an outputting start.

Furthermore, in the case of completing an output and operation, there is a low possibility to carry out an outputting continuously. In such a case, transition can be made into a power-save status. Thus, it is possible to obtain an effect that power consumption can be reduced without increasing the time up to an outputting start.

It is preferable that, in the output system according to form 9 of the invention, there is comprised of a determinable-status detecting section that detects that the usability determining section becomes a determinable status of usability, the power control section being to forward the power-save transit command when the output-completion detecting section detects a completion of the output and the determinable-status detecting section detects the determinable status.

With this structure, when the output-completion detecting section detects an output completion and the determinable-status detecting section detects a fact of becoming a determinable status, the power control section forwards a power-save transit command.

Namely, when a status becomes that another user is allowed to input authentication information (usability determinable status), the process is transited into a power-save status. No transition is made into a power save status when the process is in a status another user is not allowed to determine a usability in the state the user is authenticated (e.g. where there is a possibility that an output instruction operation be made as to another of output data) as in after completing the different operation from the output instruction, such as after an output-data deleting operation.

This makes it possible to transit the network device into a power-save status in the state completely established that the user who first obtained an authentication is not to make an operation on the output data. After an output completion, the same user upon again instructing for another output is not required to place the network device into a status ready to execute an output (warming up or so). Thus, it is possible to obtain an effect that the user need not wait for a time of warming up or so, in the duration of from a user's input of output instruction up to an outputting start.

Furthermore, in the case the output is completed and usability is determinable there is a low possibility to carry out an outputting continuously. In such a case, transition can be made into a power-save status. Thus, it is possible to obtain an effect that power consumption can be reduced without increasing the time up to an outputting start.

Here, the usability determinable status is a status allowing another user to immediately make a usability determination process, e.g. a status that, after completing an outputting, the user logs out and another user is allowed to input authentication information.

It is preferable that, in the output system according to form 10 of the invention, the power-save switchover section is to transit into a power-save status after waiting for a completion of an output by the output section when inputted with a power-save transit command for transition into a power-save status in the course of outputting by the output section, comprising an operation-completion detecting section that detects a completion of an operation for the device management apparatus, the power control section being to forward the power-save transit command to the power-save switchover section when the operation-completion detecting section detects a completion of the operation.

With this structure, when the output-completion detecting section detects an output completion, the device management apparatus at its power control section forwards a power-save transit command to the power-save switchover section.

The network device, when inputted with the power-save transit command, is transited into a power-save status by the power switchover section. Meanwhile, when in the course of outputting, transition is made into a power-save status after waiting for an output completion.

This eliminates the necessity for the device management apparatus to grasp an outputting completion at the network device, in addition to the similar effect to the form 8 output system. Thus, it is possible to obtain an effect that the device management apparatus is relieved of its processing burden.

It is preferable that, in the output system according to form 11 of the invention, the power-save switchover section is to transit into a power-save status after waiting for a completion of an output by the output section when inputted with a power-save transit command for transition into a power-save status in the course of outputting by the output section, comprising a determinable-status detecting section that detects that the usability determining section becomes a determinable status of usability, the power control section being to forward the power-save transit command to the power-save switchover section when the operation-completion detecting section detects a determinable status.

With this structure, when the determinable-status detecting section detects a fact of becoming a determinable status, the device management apparatus at the power control section forwards a power-save transit command to the power-save switchover section.

The network device, when inputted with the power-save command, is transited into a power-save status by the power-save switching section. Meanwhile, when in the course of outputting, transition is made into a power-save status after waiting for an output completion. For example, it can consider a status that the user makes an output instruction (pressing down the output button or so) at an authentication UI (user interface) and the user logs out (in the case usability becomes determinable) in the course of outputting executed thereon by the network device, immediately after which a power-save transit command is sent to the network device. In this case, the network device is to receive the power-save transit command during executing the outputting.

This eliminates the necessity for the device management apparatus to grasp an outputting completion at the network device, in addition to the effect equivalent to that of the form 9 output system. Thus, it is possible to obtain an effect that the device management apparatus is relieved of its processing burden.

It is preferable that, in the output system according to form 12 of the invention, there is comprised of an output-data deleting section that deletes the output data from the output-data storage section, the power control section is to forward a power-save transit command for transition into a power-save status when the output-data deleting section deletes the output data.

With this structure, when the output data is deleted by the output deleting section, the device management apparatus at its power control section forwards a power-save transfer command to the power-save switchover section.

The network device, when inputted with the power-save command, is transited into a power-save status by the power-save switchover section.

Due to this, when the output data is deleted, there is a low possibility to carry out an outputting continuously. In such a case, by a transition into a power-save status, power consumption can be further reduced without increasing the time up to an outputting start.

Here, it can be considered to delete output data in the timing the user looks an output data list and determines there is no data to save, for example. For example, this is the case that, despite output data intended for output is sent to the authentication UI terminal, the output data becomes unnecessary to output, or the case that output data sent is erroneous and hence the output data is not desired to output. Namely, in case output data is deleted, there is a low possibility to make an outputting on another output data continuously. Thus, the network device is transited into a power-save status thereby reducing the power consumption.

It is preferable that, in the output system according to form 13 of the invention, there is comprised of an output-data existence determining section that determines whether there is, in the output-data storage section, the output data related to the output data the output-data deleting section deleted, the power control section being to forward the power-save transit command when the output-data existence determining section determines a non-existence of the output data.

With this structure, when the output-data existence determining section determines a non-existence of the output data, the power control section forwards a power-save transit command.

Due to this, in the case that output data is deleted and the related output data is not present, there is a low possibility to carry out an outputting continuously. In such a case, by a transition into a power-save status, it is possible to obtain an effect that power consumption can be further reduced without increasing the time up to an outputting start. Namely, in the absence of stored output data, it is impossible to instruct for an outputting. In case making a transition into a power-save status in the case determined there is no stored output data, power consumption can be further reduced.

Here, the related output data refers to output data resembled in document or file name, or output data approximate in communication date/hour such as reception date/hour.

It is preferable that, in the output system according to form 14 of the invention, there is comprised of an output-data registration deleting section that deletes a registration of the output data from an index for managing output data of the output-data storage section, the power control section being to forward, to the power-save switchover section, a power-save transit command for transition into a power-save status when the output-data registration deleting section deletes a registration of the output data.

With this structure, when the output-data registration deleting section deletes a registration of the output data, the device managing section at its power control section forwards a power-save transit command to the power-save switchover section.

This obtains an effect equivalent to that of the form 12 output system. Moreover, because deleting is of only an index instead of output data main body, deleting process can be relieved. Thus, it is possible to obtain an effect that the user is allowed to make a deleting operation lightly. Incidentally, the output data main body deleted of the index may be deleted, in a state the user has not yet logged in.

It is preferable that, in the output system according to form 15 of the invention, there is comprised of an output-data registration existence determining section for determining whether there is, in the index, a registration of the output data related to a registration the output-data registration deleting section deleted, the power control section being to forward the power-save transit command when the output-data existence determining section determines a non-existence of a registration of the output data.

With this structure, when the output-data existence determining section determines a non-existence of a registration of the related output data, the power control section forwards the power-save transit command.

This obtains an effect equivalent to that of form 13. Because deletion is of only an index instead of an output-data main body, deleting process is relieved. Thus, it is obtain an effect that the user is allowed to make a delete operation lightly.

According to form 16 of the invention, there is provided a device management apparatus for managing a network device, the device management apparatus comprising: an output-data saving section that saves output data to an output-data storage section; an authentication information acquiring section that acquires authentication information; a usability determining section that determines a usability of the output data depending upon authentication information acquired at the authentication information acquiring section; an output-data transmitting section that sends, to the network device, output data determined usable by the usability determining section of among output data of the output-data storage section, and a power control section for controlling a power to the network device; the power control section being to send, to the network device, a power-save cancel command for transition into an operating status as a power-consuming status allowing the network device to make an output based on the output data after the usability determining section determines the output data to be usable and before sending of the output data by the output-data transmitting section.

This structure obtains the equivalent operation to that of the device management apparatus of the form 3 output system, and hence an effect equivalent to that of the form 3 output system.

It is preferable that, in the device management apparatus according to form 17, the power control section is to forward the power-save cancel command immediately after the usability determining section determines the output data to be usable.

This structure obtains the equivalent operation to that of the device management apparatus of the form 4 output system, and hence an effect equivalent to that of the form 4 output system.

It is preferable that, in the device management apparatus according to form 18 of the invention, the output data saving section is to save the output data and the authentication information, with correspondence, to the output data storage section, comprising an output data retrieval section that retrieves the output data, corresponding to authentication information acquired in the authentication information acquiring section, from the output data storage section, the power control section being to forward the power-save cancel command when the usability determining section determines the output data to be usable and the output data retrieval section retrieved the output data.

This structure obtains the equivalent operation to that of the device management apparatus of the form 5 output system, and hence an effect equivalent to that of the form 5 output system.

It is preferable that, in the device management apparatus according to form 19 of the invention, the output data saving section is to save the output data and the authentication information, with correspondence, to the output data storage section, comprising an output data retrieval section that retrieves the output data, corresponding to authentication information acquired in the authentication information acquiring section, from the output data storage section, the power control section being to forward the power-save cancel command when the usability determining section determines the output data to be usable and the output data retrieval section retrieved the output data unprocessed.

This structure obtains the equivalent operation to that of the device management apparatus of the form 6 output system, and hence an effect equivalent to that of the form 6 output system.

It is preferable that, in the device management apparatus according to form 20 of the invention, there is comprised of an output-completion detecting section that detects a completion of an output by the network device, the power control section being to forward, to the network device, a power-save transit command for transition into a power-save status when the output completion detecting section detects a completion of the output.

This structure obtains the equivalent operation to that of the device management apparatus of the form 7 output system, and hence an effect equivalent to that of the form 7 output system.

It is preferable that, in the device management apparatus according to form 21 of the invention, there is comprised of an operation-completion detecting section that detects a completion of an operation for the device management apparatus, the power control section being to forward the power-save transit command when the output completion detecting section detects a completion of the output and the operation-completion detecting section detects a completion of the operation.

This structure obtains the equivalent operation to that of the device management apparatus of the form 8 output system, and hence an effect equivalent to that of the form 8 output system.

It is preferable that, in the device management apparatus according to form 22 of the invention, there is comprised of a determinable-status detecting section that detects that the usability determining section becomes a determinable status of usability, the power control section being to forward the power-save transit command when the output-completion detecting section detects a completion of the output and the determinable-status detecting section detects the determinable status.

This structure obtains the equivalent operation to that of the device management apparatus of the form 9 output system, and hence an effect equivalent to that of the form 9 output system.

It is preferable that, in the device management apparatus according to form 23 of the invention, there is comprised of an operation-completion detecting section that detects a completion of an operation for the device management apparatus, the power control section being to forward the power-save transit command to the network device when the operation-completion detecting section detects a completion of the operation.

This structure obtains the equivalent operation to that of the device management apparatus of the form 10 output system, and hence an effect equivalent to that of the form 10 output system.

It is preferable that, in the device management apparatus according to form 24 of the invention, there is comprised of a determinable-status detecting section that detects that the usability determining section becomes a determinable status of usability, the power control section being to forward the power-save transit command to the power-save switchover section when the operation-completion detecting section detects a determinable status.

This structure obtains the equivalent operation to that of the device management apparatus of the form 11 output system, and hence an effect equivalent to that of the form 11 output system.

It is preferable that, in the device management apparatus according to form 25 of the invention, there is comprised of an output-data deleting section that deletes the output data from the output-data storage section, the power control section is to forward a power-save transit command for transition into a power-save status to the network device when the output-data deleting section deletes the output data.

This structure obtains the equivalent operation to that of the device management apparatus of the form 12 output system, and hence an effect equivalent to that of the form 12 output system.

It is preferable that, in the device management apparatus according to form 26 of the invention, there is comprised of an output-data existence determining section that determines whether there is, in the output-data storage section, the output data related to the output data the output-data deleting section deleted, the power control section being to forward the power-save transit command when the output-data existence determining section determines a non-existence of the output data.

This structure obtains the equivalent operation to that of the device management apparatus of the form 13 output system, and hence an effect equivalent to that of the form 13 output system.

It is preferable that, in the device management apparatus according to form 27 of the invention, there is comprised of an output-data registration deleting section that deletes a registration of the output data from an index for managing output data of the output-data storage section, the power control section being to forward, to the network device, a power-save transit command for transition into a power-save status when the output-data registration deleting section deletes a registration of the output data.

This structure obtains the equivalent operation to that of the device management apparatus of the form 14 output system, and hence an effect equivalent to that of the form 14 output system.

It is preferable that, in the device management apparatus according to form 28 of the invention, there is comprised of an output-data registration existence determining section for determining whether there is, in the index, a registration of the output data related to a registration the output-data registration deleting section deleted, the power control section being to send the power-save transit command when the output-data existence determining section determines a non-existence of a registration of the output data.

This structure obtains the equivalent operation to that of the device management apparatus of the form 15 output system, and hence an effect equivalent to that of the form 15 output system.

According to form 29 of the invention, there is provided a device management program to be executed by a computer operating as a device management apparatus for managing a network device, the program including a program for the computer to execute comprising: saving output data to a output-data storage section; acquiring authentication information; determining a usability of the output data depending upon the authentication information acquired; sending, to the network device, output data determined usable by the usability determining section of among output data in the output-data storage section; and controlling a power to the network device; the power control being to send, to the network device, a power-save cancel command for transition into the operating status after the output data is determined to be usable and before sending the output data.

With this structure, in case the program is read out by the computer and the computer executes a process according to the read-out program, the similar operation and effect to that of the form 16 device management apparatus can be obtained.

Meanwhile, it is possible to conceive, as another configuration of the device management program, a configuration for the case the host terminal stores and holds output data, as explained as another structure 1 in the foregoing form 2. In this case, the device management program includes a program for the computer to execute the process comprising authentication information acquisition, usability determination, instructing for sending output data to the network device, and power control.

Meanwhile, it is possible to conceive, as another configuration that the host terminal stores and holds output data, a configuration for the case that the authentication terminal acquires the output data authenticated and instructed for output and sends it to the network device, as explained as another structure 2 in the foregoing form 2. In this case, the device management program includes a program for the computer to execute the process comprising authentication information acquisition, usability determination, acquiring output data from the host terminal, sending the output data acquired in the output data acquisition to the network device, and power control.

Meanwhile, it is possible to conceive, as another configuration of the device management program, a configuration for the case that the network device stores and holds output data, as explained as another structure 3 in the foregoing form 2. In this case, the device management program includes a program for the computer to execute the process comprising authentication information acquisition, usability determination, instructing the network device to make an outputting, and power control.

It is preferable that, in the device management program according to form 30, the power control being to send the power-save cancel command immediately after determined usable.

With this structure, in case the program is read out by the computer and the computer executes a process according to the read-out program, the similar operation and effect to that of the form 17 device management apparatus can be obtained.

It is preferable that, in the device management program according to form 31 of the invention, the output data saving is to save the output data and the authentication information, with correspondence, to the output data storage section, comprising a program for the computer to execute the process comprising retrieving the output data, corresponding to authentication information acquired in the authentication information acquiring section, from the output data storage section, the power control being to forward the power-save cancel command when determined usable and retrieved the output data.

With this structure, in case the program is read out by the computer and the computer executes a process according to the read-out program, the similar operation and effect to that of the form 18 device management apparatus can be obtained.

It is preferable that, in the device management program according to form 32 of the invention, the output data saving is to save the output data and the authentication information, with correspondence, to the output data storage section, including retrieving the output data, corresponding to authentication information acquired in the authentication information acquiring section, from the output data storage section, the power control being to forward the power-save cancel command when determined usable and retrieved out the output data unprocessed.

With this structure, in case the program is read out by the computer and the computer executes a process according to the read-out program, the similar operation and effect to that of the form 19 device management apparatus can be obtained.

It is preferable that, in the device management program according to form 33 of the invention, there is included a program for the computer to execute the process comprising detecting a completion of an output by the output section, the power control being to forward, to the power-save switchover section, a power-save transit command for transition into a power-save status as a status lower in power consumption than in the operating status when detecting a completion of the outputting.

With this structure, in case the program is read out by the computer and the computer executes a process according to the read-out program, the similar operation and effect to that of the form 20 device management apparatus can be obtained.

It is preferable that, in the device management program according to form 34 of the invention, there is included a program for the computer to execute the process comprising detecting a completion of an operation for the device management apparatus, the power control being to forward the power-save transit command when detecting a completion of the output and a completion of the operation.

With this structure, in case the program is read out by the computer and the computer executes a process according to the read-out program, the similar operation and effect to that of the form 21 device management apparatus can be obtained.

It is preferable that, in the device management program according to form 35 of the invention, there is included a program for the computer to execute the process comprising detecting a fact of becoming a determinable status of usability, the power control being to forward the power-save transit command when detecting a completion of the output and a fact of becoming a determinable status.

With this structure, in case the program is read out by the computer and the computer executes a process according to the read-out program, the similar operation and effect to that of the form 22 device management apparatus can be obtained.

It is preferable that, in the device management program according to form 36 of the invention, there is included a program for the computer to execute the process comprising detecting a completion of an operation for the device management apparatus, the power control being to forward the power-save transit command to the network device when detecting a completion of the operation.

With this structure, in case the program is read out by the computer and the computer executes a process according to the read-out program, the similar operation and effect to that of the form 23 device management apparatus can be obtained.

It is preferable that, in the device management program according to form 37 of the invention, there is included a program for the computer to execute the process comprising detecting a fact of becoming a determinable status of usability, the power control being to forward the power-save transit command to the network device when detecting a fact of becoming a determinable status.

With this structure, in case the program is read out by the computer and the computer executes a process according to the read-out program, the similar operation and effect to that of the form 24 device management apparatus can be obtained.

It is preferable that, in the device management program according to form 38 of the invention, there is included a program for the computer to execute the process comprising deleting the output data from the output-data storage section, the power control is to send a power-save transit command for transition into a power-save status when deleting the output data.

With this structure, in case the program is read out by the computer and the computer executes a process according to the read-out program, the similar operation and effect to that of the form 25 device management apparatus can be obtained.

It is preferable that, in the device management program according to form 39 of the invention, there is included a program for the computer to execute the process comprising determining whether there is, in the print-data storage section, the output data related to output data the output-data deleting section deleted, the power control being to send the power-save transit command when determining a non-existence of the output data.

With this structure, in case the program is read out by the computer and the computer executes a process according to the read-out program, the similar operation and effect to that of the form 26 device management apparatus can be obtained.

It is preferable that, in the device management program according to form 40 of the invention, there is included a program for the computer to execute the process comprising deleting a registration of the output data from an index for managing output data of the output-data storage section, the power control being to send, to the network device, a power-save transit command for transition into a power-save status when deleting a registration of the output data.

With this structure, in case the program is read out by the computer and the computer executes a process according to the read-out program, the similar operation and effect to that of the form 27 device management apparatus can be obtained.

It is preferable that, in the device management program according to form 41 of the invention, there is included a program for the computer to execute the process comprising determining whether there is, in the index, a registration of the output data related to a registration deleted, the power control being to send the power-save transit command when determining a non-existence of a registration of the output data.

With this structure, in case the program is read out by the computer and the computer executes a process according to the read-out program, the similar operation and effect to that of the form 28 device management apparatus can be obtained.

According to form 42 of the present invention, there is provided an output method comprising: saving output data to the output data storage section; acquiring authentication information; determining usability of the output data depending upon the authentication information acquired; controlling a power to the network device; sending, to the network device, output data determined usable of among the output data of the output data storage section; switching between an operating status as a power-consuming status allowing the output at the network device and a power-save status as a status lower in power consumption than in the operating status; the power control being to forward, to the power-save switchover section, a power-save cancel command for transition into the operating status after the output data is determined to be usable and before sending of the output data.

This obtains the effect equivalent to that of the output system of form 1.

Here, outputting may be in any form provided that the outputting is performed based on output data. This includes, printing based on printing data, displaying based on display data, and sound output based on audio data. Displaying may be making a display by a projector or an LCD.

Meanwhile, the present method may be realized by a network system that a network device is communicably connected with other apparatuses, terminals and devices. In this case, output data storage, authentication information acquisition, usability determination and power control may be implemented at any of the network device and the other apparatuses or devices.

According to form 43 of the invention, there is provided an output method for a communicable connection provided between a network device that performs an output depending upon output data and a device management apparatus that manages the network device, the network device being allowed to perform an outputting upon obtaining an authentication, the output method including: saving the output data in an output-data storage section; acquiring authentication information; determining a usability of the output data depending on the authentication information acquired; and controlling a power to the network device; wherein, for the device management apparatus, is included sending, to the network device, output data determined usable of among output data in the output-data storage section, and for the network device, is included receiving the output data, performing an output based on output data received, and switching over between an operating status as a power-consuming status allowing the output and a power-save status as a status lower in power consumption than in the operating status; the power control being to forward a power-save cancel command for transition into the operating status after the output data is determined to be usable and before sending the output data.

This obtains an effect equivalent to that of the output system of form 2.

Here, outputting may be in any form provided that the outputting is performed based on output data. This includes, printing based on printing data, displaying based on display data, and sound output based on audio data. Displaying may be making a display by a projector or an LCD.

Meanwhile, the present method may be realized by a network system that a network device and a device management apparatus are communicably connected together, or by a network system communicably connected further with other apparatuses, terminals and devices. In former case, output data storage, authentication-information acquisition, usability determination and power control may be implemented at any of the network device and the device management apparatus. In the latter case, those may be executed in any of the network device, the device management apparatus and the other apparatuses and devices.

It is preferable that, in the output method according to form 44 of the invention, there is included the output data storage, the authentication information acquisition, the usability determination and power control.

This obtains an effect equivalent to that of the form 3 output system.

It is preferable that, in the output method according to form 45 of the invention, the power control is to forward the power-save cancel command immediately after determined usable in the usability determination.

This obtains an effect equivalent to that of the form 4 output system.

It is preferable that, in the output method according to form 46 of the invention, the output data saving is to save the output data and the authentication information, with correspondence, into the output data storage section, including retrieving the output data, corresponding to authentication information acquired in the authentication information acquiring section, from the output data storage section, the power control being to output the power-save cancel command when determined usable in the usability determination and retrieved the output data in the output data retrieval.

This obtains an effect equivalent to that of the form 5 output system.

It is preferable that, in the output method according to form 47 of the invention, the output data saving is to save the output data and the authentication information, with correspondence, into the output data storage section, including retrieving the output data, corresponding to authentication information acquired in the authentication information acquisition, from the output data storage section, the power control being to output the power-save cancel command when determined usable in the usability determination and retrieved the output data unprocessed in the output data retrieval.

This obtains an effect equivalent to that of the form 6 output system.

It is preferable that, in the output method according to form 48 of the invention, there is included detecting a completion of an output, the power control being to output, to the power save, a power-save transit command for transition into a power-save status when detecting a completion of the output in the output completion detection.

This obtains an effect equivalent to that of the form 7 output system.

It is preferable that, in the output method according to form 49 of the invention, there is included detecting a completion of an operation for the device management apparatus, the power control being to output the power-save transit command when detecting a completion of the output in the output completion detection and a completion of the operation in the operation completion detection.

This obtains an effect equivalent to that of the form 8 output system.

It is preferable that, in the output method according to form 50 of the invention, there is included detecting a fact of becoming a determinable status of usability, the power control being to output the power-save transit command when detecting a completion of the output and a fact of becoming the determinable status.

This obtains an effect equivalent to that of the form 9 output system.

It is preferable that, in the output method according to form 51 of the invention, the power saving is to transit into a power-save status after waiting for a completion of an output when inputted with a power-save transit command for transition into a power-save status in the course of outputting, including detecting a completion of an operation for the device management apparatus, the power control being to output the power-save transit command to the power saving when detecting a completion of the operation.

This obtains an effect equivalent to that of the form 10 output system.

It is preferable that, in the output method according to form 52 of the invention, the power saving is to transit into a power-save status after waiting for a completion of an output when inputted with a power-save transit command for transition into a power-save status in the course of outputting, including detecting a fact of becoming a determinable status of usability in the usability determination, the power control being to output the power-save transit command to the power saving when detecting a fact of becoming a determinable status.

This obtains an effect equivalent to that of the form 11 output system.

It is preferable that, in the output method according to form 53 of the invention, there is included deleting the output data from the output-data storage section, the power control being to output a power-save transit command for transition into a power-save status to the power saving when deleted the output data.

This obtains an effect equivalent to that of the form 12 output system.

It is preferable that, in the output method according to form 54 of the invention, there is included determining whether there is, in the print-data storage section, the output data related to output data deleted, the power control being to output the power-save transit command when determining a non-existence of the output data.

This obtains an effect equivalent to that of the form 13 output system.

It is preferable that, in the output method according to form 55 of the invention, there is included deleting a registration of the output data from an index for managing output data of the output-data storage section, the power control being to output, to the power saving, a power-save transit command for transition into a power-save status when deleted a registration of the output data.

This obtains an effect equivalent to that of the form 14 output system.

It is preferable that, in the output method according to form 56 of the invention, there is included determining whether there is, in the index, a registration of the output data related to a registration deleted, the power control being to output the power-save transit command When determining a non-existence of a registration of the output data.

This obtains an effect equivalent to that of the form 15 output system.

According to form 57 of the invention, there is provided a printing system having a network printer that performs a printing based on a print job, the network printer being allowed for the printing upon acquiring an authentication, the printing system comprising: a print data storage section that stores the print data; a print-data saving section that saves the print data to the print-data storage section; an authentication information acquiring section that acquires authentication information; a usability determining section that determines a usability of the print data depending upon the authentication information acquired at the authentication information acquiring section; a power control section that controls a power to the network printer; a print-data transmitting section that sends, to the network printer, print data determined usable by the usability determining section of among print data in the print-data storage section; and a power-save switchover section that switches over between an operating status as a power-consuming status allowing the printing at the network printer and a power-save status as a status lower in power consumption than in the operating status; the power control section being to forward, to the power-save switchover section, a power-save cancel command for transition into the operating status after the usability determining section determines the print data to be usable and before the print-data transmitting section sends the print data.

With this structure, the print data saving section saves print data to the print data storage section. When authentication information is acquired at the authentication information acquiring section, the usability determining section determines a usability of the print data depending upon the authentication information acquired.

When determined usable, the print data transmitting section sends the print data of the print data storage section to the network printer.

Meanwhile, the power control section forwards a power-save cancel command to the power-save switchover section after the print data is determined to be usable and before sending of print data.

When the power-save cancel command is inputted, the power-save switchover section causes the network printer to transit into an operating status, thus becoming a status allowed for printing. The network printer in this status, when receiving the print data, performs a printing based on the received print data.

This cancels the network printer of its power-save status after completing an authentication. Even in case the user takes a time from sending the print data up to completing an authentication, the power-save status is maintained in that duration. Meanwhile, because the power-save status is canceled before receiving the print data, printing is started without taking a significant time. Accordingly, it is possible to obtain an effect that power consumption can be reduced as compared to the existing ones without increasing the time up to a print start.

Here, the operating status may be a status in a mode called a standby mode or the like on the usual printer. In this mode, the printer is placed in a status (e.g. warmed-up status) minimal in the time (wait time) (different depending on printer performance) of from receiving print data up to a print (image forming) start.

Meanwhile, the power-save status may be a status in a mode called a sleep or low-power mode or the like on the usual printer. In this mode, the printer is placed in a minimal power consumption status (some models have two-stage power-save modes (e.g. pre-heating mode, save-power mode)). In this status, when receiving print data, transition is made into an operating status. Consequently, in the power-save status, a time for warming-up, or the like is needed for a transition into an operating status for executing a printing in a minimal time. By this amount, the wait time, of from receiving print data up to a print start, is required longer than in the operating status.

Meanwhile, the power-save status includes a status for operating the network printer in a low power consumption state required for data reception checking, in a wait time or the like wherein no print data reception is made on the network printer as mentioned before. Besides, it includes a status for reducing power consumption required for outputting, e.g. decreasing the outputting rate or lowering the output quality.

Meanwhile, authentication information is information relating a user and print data together, e.g. e.g. a structure that the information specifying a user individuality is included in output data and an authentication card, a structure assigning an identifiers for identifying a user for each of output data, a structure in combination of those. Furthermore, by including the information (password, or the like) for confirming an authenticated user himself/herself, security can be improved.

Meanwhile, "forwarding" includes "sending" of a command such as a power-save switch command to an apparatus having a power-save switchover section through a network, where an apparatus having a power-control section and an apparatus having a power-save switchover section are provided separate and connected with each other through a network such as a LAN (including a wireless LAN), a WAN, or the Internet. For example, where a power control section and a power-save switchover section are within the same apparatus, "outputting" of a command such as a power-save switch command by the power control section to the power-save switchover section is included.

Meanwhile, forwarding a power-save cancel command may be in any timing provided that it is after the output data is determined to be usable and before sending of output data.

Meanwhile, the present system may be realized as a network system which a network printer is communicably connected with other apparatuses, terminals and devices. In this case, the print-data storage section, the print-data saving section, the authentication information acquiring section, the usability determining section and the power control section may belong to any of the network printer and other apparatuses/devices.

According to form 58 of the invention, there is provided a printing system that a communicable connection is provided between a network printer for performing a printing depending upon print data and a device management apparatus for managing the network printer, the network printer being allowed to perform a printing upon obtaining an authentication, the printing system comprising: a print data storage section that stores the print data; a print data saving section that saves the print data to the print data storage section; an authentication information acquiring section that acquires authentication information; a usability determining section that determines a usability of the print data depending on authentication information acquired at the authentication information acquiring section; and a power control section for controlling a power to the network printer; the device management apparatus having a print data transmitting section that sends, to the network printer, print data which the usability determining section determined usable of among the print data of the print data storage section; the network printer having a print data receiving section that receives the print data, a printing section that performs a printing depending upon print data received at the print data receiving section, a power-save switchover section that switches over between an operating status as a power-consuming status allowing the printing at the printing section and a power-save status as a status that consumed power is lower than in the operating status; the power control section being to forward, to the power-save switchover section, a power-save cancel command for transition into the operating status after the usability determining section determines the print data to be usable and before the print data transmitting section sends the print data.

With this structure, the print-data saving section saves print data to the print-data storage section. When authentication information is acquired at the authentication information acquiring section, the usability determining section determines a usability of the print data depending upon the acquired authentication information.

At the device management apparatus, when determined usable, the print-data transmitting section sends the print data of the print-data storage section to the network device.

Meanwhile, the power control section forwards a power-save cancel command to the power-save switchover section after the print data is determined to be usable and before sending of print data.

The network printer, when inputted with the power-save cancel command, is transited into an operating status by the power-save switchover section thus becoming a status allowing a printing at the printing section. In this status, in case print data is received at the print-data receiving section, the printing section makes a printing based on the received print data.

Due to this, the network printer is canceled of the power-save status after completing an authentication. Even in case the user is required a time from sending of print data up to completing an authentication, the power-save status is maintained in that duration. Also, because the power-save status is canceled before receiving the print data, outputting is started without significantly taking a time. Therefore, it is possible to obtain an effect that power consumption can be reduced as compared to the existing one without increasing the time up to a print start.

Here, the present system may be realized as a network system that a network printer and a device management apparatus are communicably connected together, or as a network system that other apparatuses, terminals and devices are further connected for communication. In the former case, the print-data storage section, the print-data saving section, the authentication information acquiring section, the usability determining section and the power control section may belong to any of the network printer and the device management apparatus. In the latter case, those sections may belong to any of the network printer, the device management apparatus and other apparatuses.

Meanwhile, it is possible to conceive, as another configuration in the present system, another configuration 1 that print data is held in a host terminal under control of the user. In this case, the host terminal has at least a print-data storage section, a print-data saving section, and a print-data second transmitting section that sends to the network device the output data instructed for sending, while an authentication terminal for usability determination has at least a usability determining section and a print-data transmission instructing section that makes an instruction to send the print data determined usable by the host terminal and instructed for printing.

Namely, when issuing a print request at the host terminal, the print data is stored and held in the host terminal. When the user, obtained an authentication at the authentication terminal, selects a print request retained and instructs to print it, the authentication terminal instructs the host terminal storing and holding the print data instructed for printing, to send the relevant print data to the network printer instructed for printing. The host terminal sends the print data instructed for transmission to the network printer. The network device, when receiving the print data from the host terminal, performs a printing.

Meanwhile, it is also possible to conceive, as another configuration that holds output data in a host terminal, another configuration 2 that the output data authenticated and instructed for printing is acquired by an authentication terminal and sent to a network printer. In this case, the host terminal has at least a print-data storage section and a print-data saving section while the authentication terminal has at least a usability determining section, a print-data acquiring section that acquired from the host terminal the print data determined usable by the host terminal and instructed for printing, and a print-data second transmitting section that sends the print data acquired at the print-data acquiring section to a network printer the relevant print data is instructed for printing.

Namely, when issuing a print request at the host terminal, the print data is held in the host terminal. When the user, obtained an authentication at the authentication terminal, selects a print request retained and instructs for printing, the authentication terminal acquires the print data from the host terminal and sends the acquired print data to the network printer instructed for printing. The network printer, when receiving the print data from the host terminal, performs a printing.

Meanwhile, it is also possible to conceive, as another configuration in the present system, another configuration 3 wherein print data is held at a network printer. In this case, the network printer has at least a print-data storing section, the host terminal has at least a print-data transmitting section, and the authentication terminal has at least a print instructing section that instructs the network printer to print the print data determined usable and instructed for printing.

Namely, when issuing a print request at the host terminal, the print data is held in the print-data storing section haven by the network printer by being sent to the network printer or so. When the user, obtained an authentication at the authentication terminal, selects a print request retained and instructs to print it, the print instructing section instructs, for printing, the network printer holding the print data instructed for printing. The network printer performs a printing according to the print-instruction from the authentication terminal.

It is preferable that, in the printing system according to form 59 of the invention, the device management apparatus has the output data saving section, the authentication information acquiring section, the usability determining section, and the power control section.

With this structure, in the device management apparatus, the print-data saving section saves the output data to the print-data storage section. When authentication information is acquired at the authentication information acquiring section, the usability determining section determines a usability of the print data depending upon the acquired authentication information. As a result, when determined usable, the print-data transmitting section sends the print data of the print-data storage section to the network printer. Meanwhile, the power control section forwards a power-save cancel command to the save-power switchover section after the print data is determined to be usable and before sending of the print data.

This makes it possible to control the power status of the network printer, at the device management apparatus. Thus, it is possible to obtain an effect that a plurality of network printers can be collectively controlled as to the power status by a single device management apparatus without providing the network printers with a function to control the power status of the network printers.

It is preferable that, in the output system according to form 60 of the invention, the power control section is to forward the power-save cancel command immediately after the usability determining section determines usable.

With this structure, when determined usable, the power control section forwards a power-save cancel command.

This obtains an effect that outputting can be started swiftly because, usually, the power-save status is canceled before the user starts an operation.

Here, "immediately after determined" is in the timing of forwarding a power-save cancel command with a less passage of time after determined usable, desirably in earlier timing to a possible extent.

It is preferable that, in the printing system according to form 61 of the invention, the print data saving section is to save the print data and the authentication information, with correspondence, to the print data storage section, comprising a print data retrieval section that retrieves the print data, corresponding to authentication information acquired in the authentication information acquiring section, from the print data storage section, the power control section being to forward the power-save cancel command when the usability determining section determines the print data to be usable and the print data retrieval section retrieved the print data.

With this structure, when determined usable and the print data concerned is retrieved out, the power control section forwards a power-save cancel command.

This obtains an effect that power consumption can be further reduced because the power-save status is canceled only in the case that an authentication is obtained and the print data concerned exists.

It is preferable that, in the printing system according to form 62 of the invention, the print data saving section is to save the print data and the authentication information, with correspondence, to the print data storage section, comprising a print data retrieval section that retrieves the print data, corresponding to authentication information acquired in the authentication information acquiring section, from the print data storage section, the power control section being to forward the power-save cancel command when the usability determining section determines the print data to be usable and the print data retrieval section retrieved the print data unprocessed.

With this structure, when determined usable and unprocessed print data is retrieved out, the power control section forwards a power-save cancel command. Namely, for example, in a structure that the print data processed for printing is left in the print-data storage section wherein re-printing is available for the same print data, when there is print data not print-processed even once after stored among those of the print data stored in the print-data storage section, a power-save cancel command is forwarded.

This obtains an effect that, because there is a high possibility to carry out an printing in the case an authentication is obtained and unprocessed print data exists, power consumption can be further reduced by canceling the power-save status limitedly in such a case.

It is preferable that, in the printing system according to form 63 of the invention, there is comprised of a print-completion detecting section that detects a completion of a print by the printing section, the power control section being to forward, to the power-save switchover section, a power-save transit command for transition into a power-save status when the print-completion detecting section detects a completion of the printing.

With this structure, when print-completion detecting section detects a print completion, the device management apparatus at its power control section forwards a power-save transit command to the power-save switchover section.

The network printer, when inputted with the power-save transit command, is transited into a power-save status by the power switchover section.

This obtains an effect that power consumption can be further reduced because transition is done into a power-save status immediately after a completion of the printing.

Here, the print-completion detecting section is a section to detect a completion of the printing executed at the network printer. For example, whether the printing is completed or not can be determined by making an inquiry to a print-data managing function haven by the network printer. Incidentally, the print-data managing function, capable of determining whether or not printing is completed, is a known function in the usual network printer.

It is preferable that, in the printing system according to form 64 of the invention, there is comprised of an operation-completion detecting section that detects a completion of an operation for the device management apparatus, the power control section being to forward the power-save transit command when the print completion detecting section detects a completion of the printing and the operation-completion detecting section detects a completion of the operation.

With this structure, when the print-completion detecting section detects a print completion and the operation-completion detecting section detects an operation completion, the power control section forwards a power-save transit command.

Namely, even after completing the printing, an instruction for transition into a power-save status is not issued during user's operation, e.g. displaying a list of print data, selecting and printing those not selected as objects-of-print in the first print instruction or so.

Due to this, after the print completion, the same user upon again instructing for another printing is not required to place the network printer into a status ready to execute a printing (warming up or so). Thus, it is possible to obtain an effect that the user need not wait for a time of warming up or so, in the duration of from a user's input of print instruction up to a printing start.

Furthermore, in the case of completing the printing and operation, there is a low possibility to carry out a printing continuously. In such a case, transition can be made into a power-save status. Thus, it is possible to obtain an effect that power consumption can be reduced without increasing the time up to a printing start.

It is preferable that, in the printing system according to form 65 of the invention, there is comprised of a determinable-status detecting section that detects that the usability determining section becomes a determinable status of usability, the power control section being to forward the power-save transit command when the print-completion detecting section detects a completion of the printing and the determinable-status detecting section detects the determinable status.

With this structure, when the print-completion detecting section detects a print completion and the determinable-status detecting section detects a fact of becoming a determinable status, the power control section forwards a power-save transit command.

Namely, when becoming a status that another user is allowed to input authentication information (usability determinable status), the process is transited into a power-save status. No transition is made into a power save status when the process is in a status another user is not allowed to determine a usability in the state the user is authenticated (e.g. where there is a possibility that an output instruction operation be made as to another of print data) as in after completing the different operation from the print instruction, such as after a print data deleting operation.

This makes it possible to transit the network printer into a power-save status in the state completely established that the user who first obtained an authentication is not allowed to make an operation to the print data. After a print completion, the same user upon again instructing for another printing is not required to place the network printer into a status ready to execute a printing (warming up or so). Thus, it is possible to obtain an effect that the user need not wait for a time of warming up or so, in the duration of from a user's input of print instruction up to a printing start.

Furthermore, in the case the printing is completed and usability is determinable, there is a low possibility to carry out a printing continuously. In such a case, transition can be made into a power-save status. Thus, it is possible to obtain an effect that power consumption can be reduced without increasing the time up to a printing start.

Here, the usability determinable status is a status allowing another user to immediately makes a determination process of usability, e.g. a status that, after completing a printing, the user logs out and another user is allowed to input authentication information.

It is preferable that, in the printing system according to form 66 of the invention, the power-save switchover section is to transit into a power-save status after waiting for a completion of a printing by the printing section when inputted with a power-save transit command for transition into a power-save status during a printing by the printing section, comprising an operation-completion detecting section that detects a completion of an operation for the device management apparatus, the power control section being to forward the power-save transit command to the power-save switchover section when the operation-completion detecting section detects a completion of the operation.

With this structure, when the print-completion detecting section detects a print completion, the device management apparatus at its power control section forwards a power-save transit command to the power-save switchover section.

The network printer, when inputted with the power-save transit command, is transited into a power-save status by the power switchover section. Meanwhile, when in the course of printing, transition is made into a power-save status after waiting for a print completion.

This eliminates the necessity for the device management apparatus to grasp a printing completion at the network printer, in addition to the similar effect to the form 64 printing system. Thus, it is possible to obtain an effect that the device management apparatus is relieved of its processing burden.

It is preferable that, in the printing system according to form 67 of the invention, the power-save switchover section is to transit into a power-save status after waiting for a completion of a printing by the printing section when inputted with a power-save transit command for transition into a power-save status in the course of printing by the printing section, comprising a determinable-status detecting section that detects that the usability determining section becomes a determinable status of usability, the power control section being to forward the power-save transit command to the power-save switchover section when the operation-completion detecting section detects a determinable status.

With this structure, when the determinable-status detecting section detects a fact of becoming a determinable status, the device management apparatus at the power control section forwards a power-save transit command to the power-save switchover section.

The network printer, when inputted with the power-save command, is transited into a power-save status by the power-save switching section. Meanwhile, when in the course of printing, transition is made into a power-save status is after waiting for a print completion. For example, it can consider a status that the user makes a print instruction (pressing down the output button or so) at an authentication UI (user interface) and the user logs out (in the case usability becomes determinable) during a printing executed thereon by the network printer, immediately after which a power-save transit command is sent to the network printer. In this case, the network printer is to receive the power-save transit command during executing the printing.

This eliminates the necessity for the device management apparatus to grasp a printing completion at the network printer, in addition to the effect equivalent to that of the form 65 printing system. Thus, it is possible to obtain an effect that the device management apparatus is relieved of its processing burden.

It is preferable that, in the printing system according to form 68 of the invention, there is comprised of a print-data deleting section that deletes the print data from the print-data storage section, the power control section is to forward a power-save transit command for transition into a power-save status when the print-data deleting section deletes the print data.

With this structure, when the print data is deleted by the print-data deleting section, the device management apparatus at its power control section forwards a power-save transfer command to the power-save switchover section.

The network printer, when inputted with the power-save command, is transited into a power-save status by the power-save switchover section.

Due to this, when the print data is deleted, there is a low possibility to carry out an outputting continuously. In such a case, by a transition into a power-save status, power consumption can be further reduced without increasing the time up to a printing start.

Here, it can be considered to delete print data in the timing the user looks a print data list and determines there is no data to save, for example. For example, this is the case that, despite print data intended for printing is sent to the authentication UI terminal, the print data becomes unnecessary to output, or the case that print data sent is erroneous and hence the print data is not desired to print out. Namely, in case print data is deleted, there is a low possibility to carry out a printing of another print data continuously. Thus, the network printer is transited into a power-save status thereby reducing the power consumption.

It is preferable that, in the printing system according to form 69 of the invention, there is comprised of a print-data existence determining section that determines whether there is, in the print-data storage section, the print data related to the print data which the print-data deleting section deleted, the power control section being to forward the power-save transit command when the print-data existence determining section determines a non-existence of the print data.

With this structure, when the print-data existence determining section determines a non-existence of the related print data, the power control section forwards a power-save transit command.

Due to this, in the case that print data is deleted and the related print data does not exist, there is a low possibility to carry out a printing continuously. In such a case, by a transition into a power-save status, it is possible to obtain an effect that power consumption can be further reduced without increasing the time up to a printing start. Namely, in the absence of print data being stored, it is impossible to make a print instruction. By a transition into a power-save status when determining no print data being stored, power consumption can be further reduced.

Here, the related print data refers to print data resembled in document or file name, or output data approximate in communication date/hour such as reception date/hour.

It is preferable that, in the printing system according to form 70 of the invention, there is comprised of a print-data registration deleting section that deletes a print data registration from an index for managing print data of the print-data storage section, the power control section being to forward, to the power-save switchover section, a power-save transit command for transition into a power-save status when the print-data registration deleting section deletes a print data registration.

With this structure, when a print data registration is deleted by the print-data registration deleting section, the device managing section at its power control section forwards a power-save transit command to the power-save switchover section.

This obtains the effect equivalent to that of the form 68 printing system. Moreover, because deleting is of only an index instead of print data main body, deleting process can be relieved. Thus, it is possible to obtain an effect that the user is allowed to make a deleting operation lightly. Incidentally, the print data main body deleted of the index may be deleted, in a state the user has not yet logged in.

It is preferable that, in the printing system according to form 71 of the invention, there is comprised of a print-data registration existence determining section for determining whether there is, in the index, a print data registration related to a registration the print-data registration deleting section deleted, the power control section being to forward the power-save transit command when the print-data existence determining section determines a non-existence of a print data registration.

With this structure, when the print-data existence determining section determines a non-existence of a registration of the related print data, the power control section forwards the power-save transit command.

This obtains an effect equivalent to that of form 69. Besides, because deletion is of only an index instead of a print-data main body, deleting process is relieved. Thus, it is obtain an effect that the user is allowed to make a delete operation lightly.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the drawings, a description is now made of a first embodiment of the present invention. FIGS. 1 to 13 show a first embodiment of an output system, device management apparatus, device management program and output method according to the invention.

Figure 1:
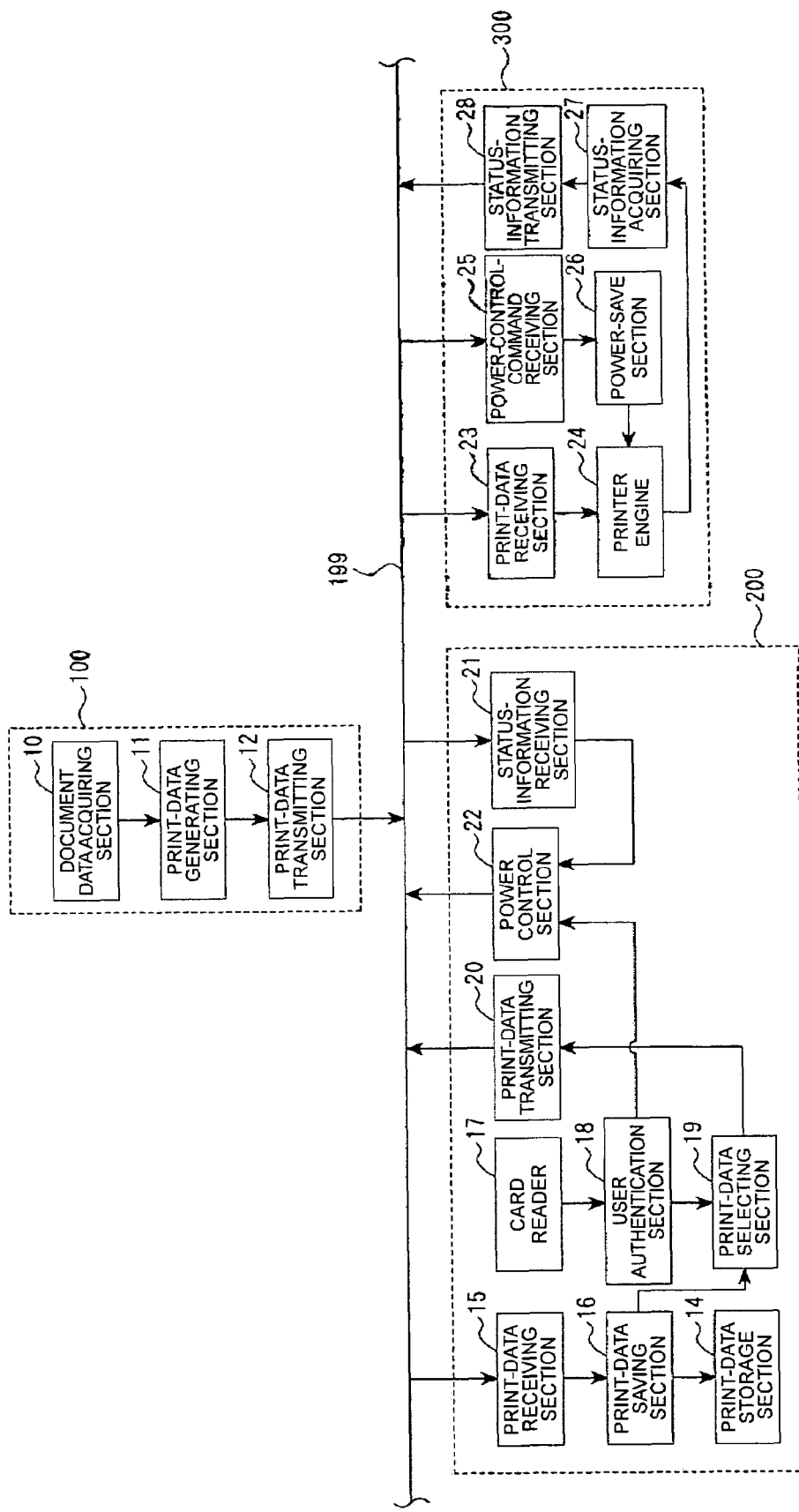
FIG. 1 is a functional block diagram showing a functional outline of a network system.

In the present embodiment, the output system, device management apparatus, device management program and output method of the invention are applied for the case to perform a printing at a network printer 300 by utilization of an authentication card wherein control is taken for the power to the network printer 300 as shown in FIG. 1.

Referring to FIG. 1, first explained is the functional outline of a network system to which the invention is applied.

FIG. 1 is a functional block diagram showing a network system functional outline.

A network 199 is connected with a host terminal 100 served for a user to use, a network printer 300, and a user authentication apparatus 200 set up nearby the network printer 300, as shown in FIG. 1.

The host terminal 100 is configured with a document-data acquiring section 10 for acquiring document data, a print-data generating section 11 for generating print data depending upon the document data acquired at the document-data acquiring section 10, and a print-data transmitting section 12 for sending the print data generated at the print-data generating section 11 to the user authentication apparatus 200.

The user authentication apparatus 200 is configured with a print-data storage section 14, a print-data receiving section 15 for receiving print data, a print-data saving section 16 that saves the print data received at the print-data receiving section 15 to the print-data storage section 14.

The user authentication apparatus 200 is further configured with a card reader 17 for reading authentication information out of an authentication card provided, a user authentication section 18 that determines a usability of print data depending upon the authentication information read out by the card reader 17, a print-data selecting section 19 that allows to select print data when the user authentication section 18 determines the print data to be usable so that the user can select print data out of the print-data storage section 14, and a print-data transmitting section 20 that sends the print data selected by the print-data selecting section 19 to the network printer 300.

The user authentication apparatus 200 is further configured with a status-information receiving section 21 that receives status information representative of a progress status of a printing, and a power control section 22 that takes control of the power to the network printer 300 depending upon a result of authentication at the user authentication section 18 and the status information received at the status-information receiving section 21.

The power control section 22 is to send a power-save cancel command for transition into a warm-up status to the network printer 300 when the user authentication section 18 determines an applicability-for-use. Meanwhile, it is also to determine whether or not the network printer 300 completed a printing, depending upon status information. When determining the printing is completed, a power-save transit command for transition into a power-save status is sent to the network printer 300.

The network printer 300 is configured with a print-data receiving section 23 for receiving print data, a printer engine 24 for performing a printing depending upon the print data received at the print-data receiving section 23, a power-control-command receiving section 25 for receiving a power-save cancel command and power-save transit command, and a power-save section 26 for switching between a power-save status and a warm-up status depending upon a power-save cancel command or power-save transit command received at the power-control-command receiving section 25.

The network printer 300 is further configured with a status-information acquiring section 27 for acquiring status information at a regular time interval depending upon the status of the printer engine 24, and a status-information transmitting section 28 for sending the status information acquired at the status-information acquiring section 27 to the user authentication apparatus 200.

The configuration of the host terminal 100 is now explained.

Figure 2:
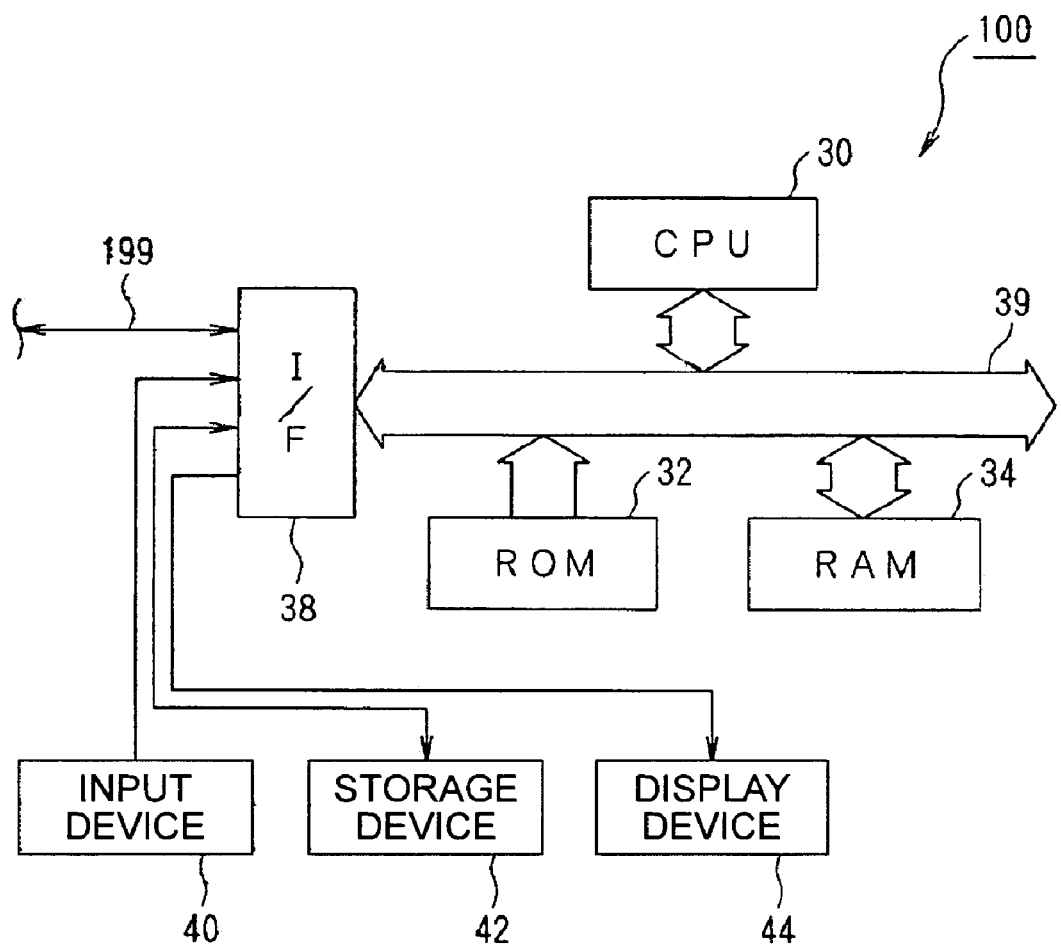
FIG. 2 is a block diagram showing a hardware arrangement of a host terminal.

FIG. 2 is a block diagram showing a hardware arrangement of the host terminal 100.

The host terminal 100 is configured, as shown in FIG. 2, with a CPU 30 for making an operation and system overall control depending upon a control program, a ROM 32 previously stored with a CPU 30 control program, or the like in its predetermined domain, a RAM 34 for storing the data read out of the ROM 32, or the like and an operation result required in the process operating at the CPU 30, and an I/F 38 mediating the data input and output to and from the external apparatus. Those are connected by a bus 39 mutually and for exchange data that is as a signal line for transferring data.

The I/F 38 is connected with an input device 40, e.g. a key board or a mouse, as a human interface for inputting data, a storage device 42 for storing data, a table, or the like in the form of a file, a display device 44 for making an on-screen display depending upon an image signal, and a signal line for connection to the network 199.

Figures 3, 4:
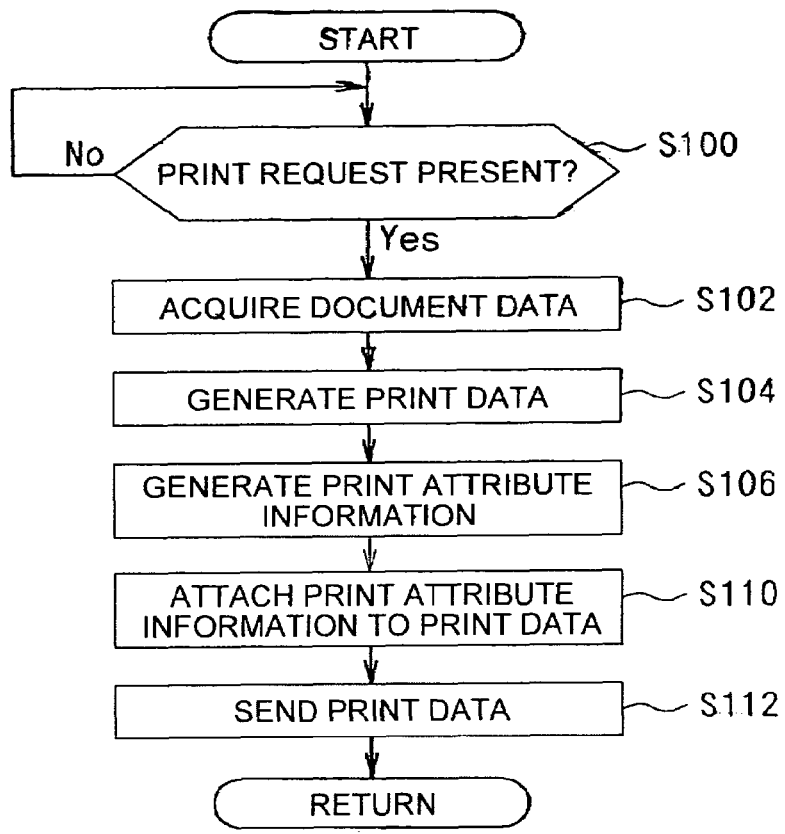
FIG. 3 is a flowchart showing a print request process.
FIG. 4 is a figure showing a data structure of print attribute information.

The CPU 30, configured by a micro-processing unit or the like, is to start up a predetermined program stored in a predetermined domain of the ROM 32 and executes a print-request process shown in a FIG. 3 flowchart according to that program.

FIG. 3 is a flowchart showing a print-request process.

The print request process is a process requesting the user authentication apparatus 200 to print. When executed in the CPU 30, the process first moves to S100 as shown in FIG. 3.

At step S100, the process determines whether there is a print request from a document-production application or the like. When it is determined that there is a print request (Yes), the process moves to step S102. However, when it is determined not so (No), the process at step S100 waits until a print request comes.

At step S102, document data to be printed is acquired from the document-production application, or the like. The process moves to step S104 where print data is generated based on the acquired document data, and then moves to step S106.

At step S106, acquired are a user ID of a user who requested for a printing, a file name of document data, terminal information representative of an address of the host terminal 100, date of printing and print settings. Based on those pieces of information acquired, generated is print attribute information representative of an attribute of print data.

FIG. 4 is a figure showing a data structure of the print attribute information 400.

The print attribute information 400 includes fields 402-410, respectively including a use ID, a document-data file name, terminal information, print date and print settings, as shown in FIG. 4.

Referring back to FIG. 3, the process then moves to step S110 where the generated print attribute information is attached to the print data. The process moves to step S112 where the print data attached with the print attribute information is sent over to the network printer 300. Thus the process is returned to the former process after ending the series of process steps.

The configuration of the user authentication apparatus 200 is now explained.

Figures 5, 6:
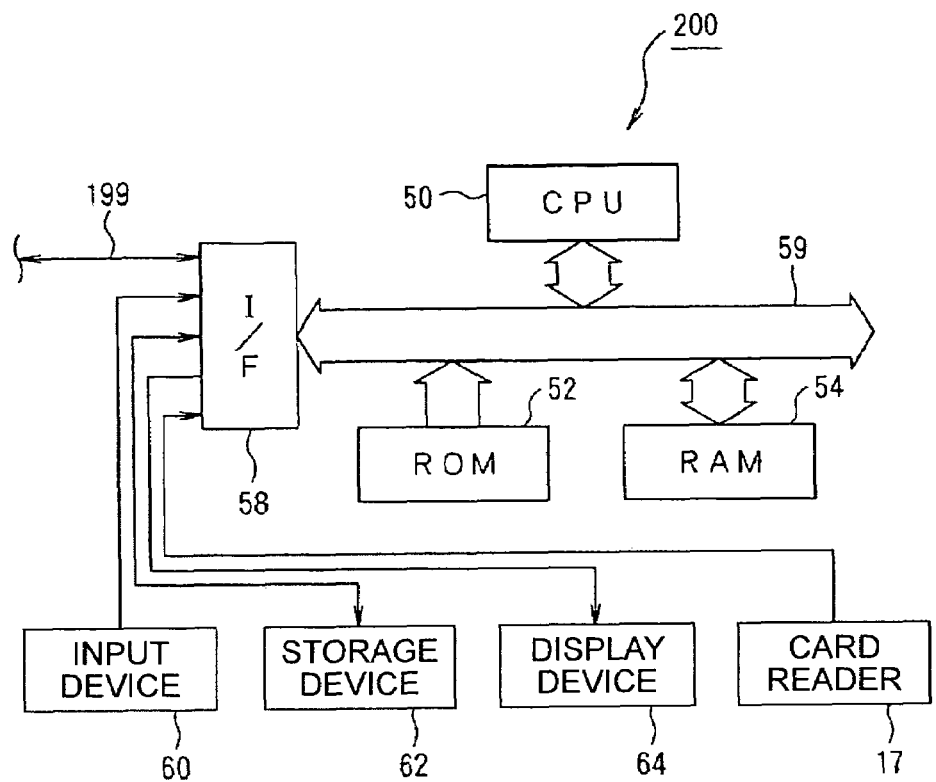
FIG. 5 is a block diagram showing a hardware arrangement of a user authentication apparatus.
FIG. 6 is a figure showing a data structure of print job management table.

FIG. 5 is a block diagram showing a hardware arrangement of the user authentication apparatus 200.

The user authentication apparatus 200 is connected with a CPU 50, a ROM 52, a RAM 54 and an I/F 58 through a bus 59 similar to the host terminal 100, wherein the I/F 58 is connected with an input device 60, a storage device 62, a display device 64, a card reader 17 and a signal line for connection to the network 199, as shown in FIG. 5.

The storage device 62 is stored with a print-job management table 420 for managing a print job.

FIG. 6 is a figure showing a data structure of the print-job management table 420.

In the print-job management table 420, one record is registered for each of print data, as shown in FIG. 6. Each record includes a field 422 registering a job ID assigned to print data, a field 424 registering a user ID, a field 426 registering a print-data file name, a field 428 registering a number of times of prints, and a field 430 registering other pieces of print attribute information.

In the FIG. 6 example, the record on the first line registers "1" as a job ID, "takahashi" as a user ID, "0001.prn" as a print-data file name and "1" as the number of times of prints, respectively. This means that print job 1 (print data assigned with job ID "1", hereinafter abbreviated likewise) is requested for a printing by the user having a user ID "takahashi", which has been printed once in the past.

Meanwhile, the storage device 62 stores an authentication-information management table 440 that manages the authentication information for authenticating a user.

Figures 7, 8:
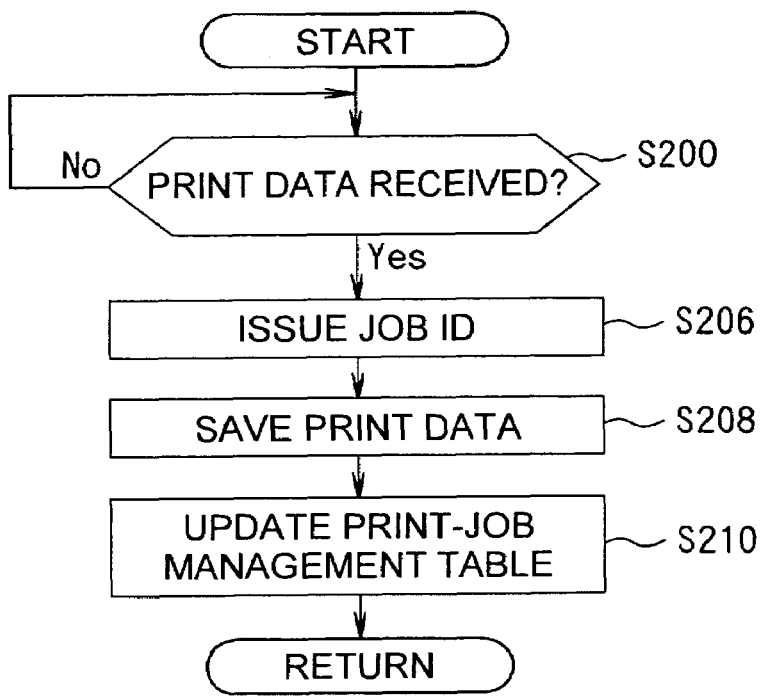
FIG. 7 is a figure showing an authentication information management table.
FIG. 8 is a flowchart showing a print-data saving process.

FIG. 7 is a figure showing a data structure of the authentication-information management table 440.

In the authentication-information management table 440, one record is registered on each user, as shown in FIG. 7. Each record includes a field 442 registering a user ID and a field 444 registering a password. In order to obtain an authentication at the authentication apparatus 200, the user ID and password, included in the authentication information read out of the authentication card, must agree with a user ID and password in any of the records.

Figure 9:
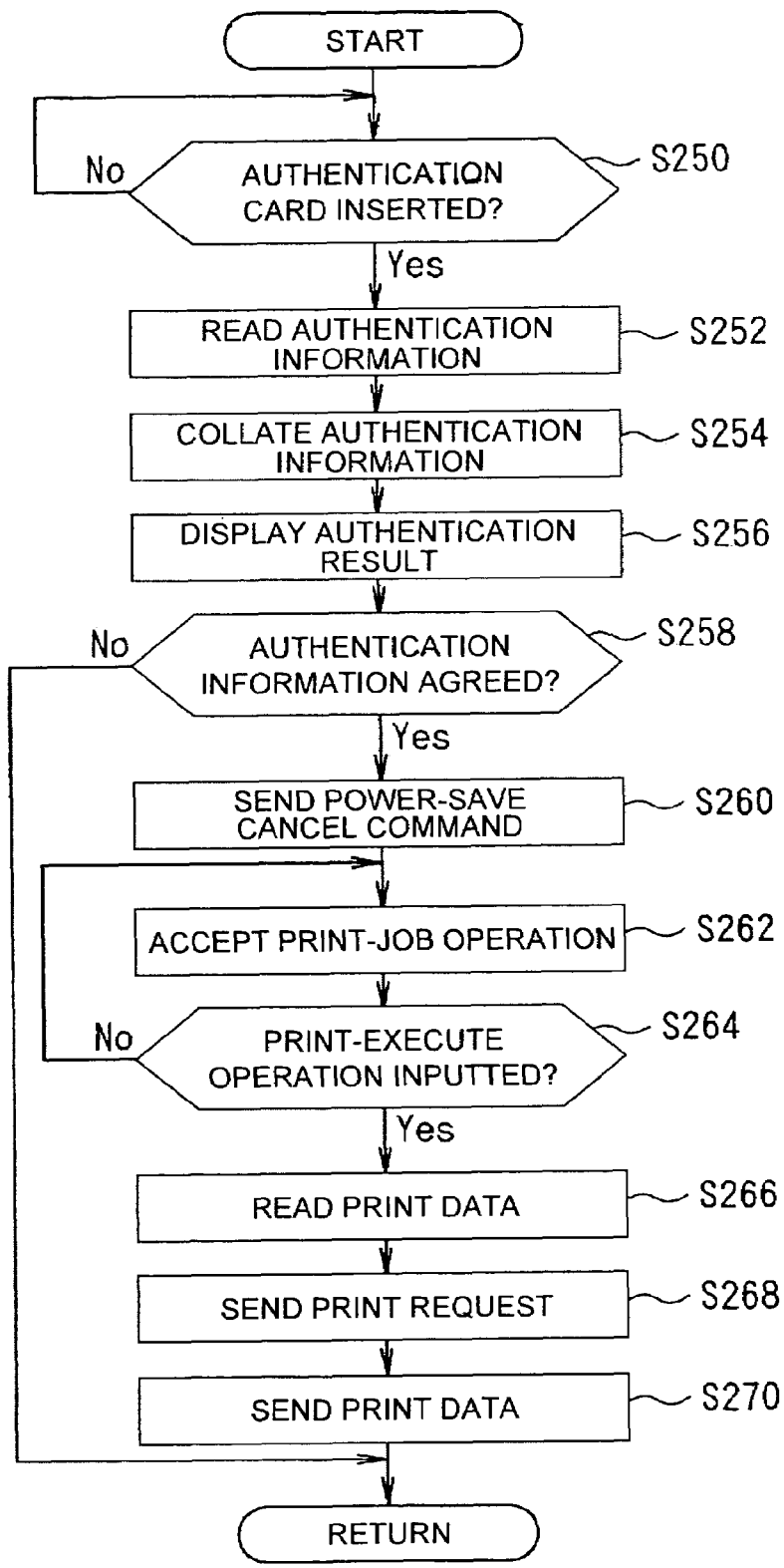
FIG. 9 is a flowchart showing a user authentication process.
Figure 10:
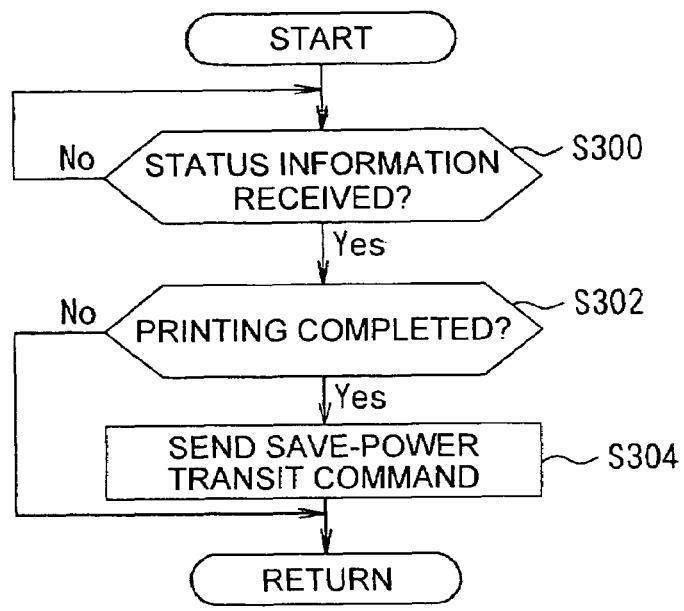
FIG. 10 is a flowchart showing a power-save transit control process.

The CPU 50, configured by a micro-processing unit or the like, is to start up a predetermined program stored in a predetermined domain of the ROM 52 and execute time-divisionally the print-data saving process, the user authentication process and the power-save transit control process, respectively, shown in the flowcharts of FIGS. 8, 9 and 10 according to the program.

The print-data storage process is first explained.

FIG. 8 is a flowchart showing a print-data storage process.

The print-data saving process is a process to save the print data of from the host terminal 100. When executed in the CPU 50, the process first moves to step S200, as shown in FIG. 8.

At step S200, the process determines whether or not received print data. When it is determined that the print data is received (yes), the process moves to step S206. However, when it is determined not so (No), the process waits at step S200 until receiving print data.

At step S206, a job ID is issued for the received print data and the process moves to step S208 where the received print data is saved in the storage device 62 and the process moves to step S210 where a file name is acquired from the received print data, thereby registering a new record including the issued job ID, acquired file name and received print attribute information to the print-job management table 420. At this time, "0" is registered as to the number of times of prints.

After ending the process at step S210, the process is returned to the former process by ending the series of process steps.

The user authentication process is now explained.

FIG. 9 is a flowchart showing the user authentication process.

The user authentication process is a process to determine whether or not a printing is allowed, depending upon authentication information. When executed in the CPU 50, the process first moves to step S250 as shown in FIG. 9.

At step S250, the process determines whether or not an authentication card is inserted in the card reader 17. When an authentication card is determined inserted (Yes), the process moves to step S252. However, when determined not so (No), the process waits at step S250 until an authentication card is inserted.

At step S252, authentication information is read out of the authentication card by the card reader 17 and the process moves to step S254 where the user ID and password contained in the read-out authentication information with the user ID and password registered in the authentication-information management table 440. The process moves to step S256 where the authentication result is displayed on the display device 64, and the process moves to step S258.

At step S258, the process determines whether or not there is an agreement in the authentication information from a collation result. When there is an agreement in the authentication information (Yes), the process moves to step S260 where a power-save cancel command is sent to the network printer 300, and the process moves to step S262.

At step S262, the print data corresponding to the user ID contained in the read-out authentication information is retrieved from the print-job management table 420. A list of print data is displayed on the display device 64, to accept a print-job operation. The print-job operation includes an operation to select any one from those in the print data list, an operation to instruct for making a printing of the selected print data (print-execute operation), an operation to instruct for ending and logging out the print-job operation (log-out operation), an operation to instruct for deleting all the print data of his/her own (all-delete operation), and an operation to instruct for deleting the selected print data (designation-delete operation).

Then, the process moves to step S264 where the process determines whether or not there is an input of print-execute operation. When there is an input of print-execute operation (Yes), the process moves to step S266. However, when not so (No), the process moves to step S264.

At step S266, the image data selected by the inputted print-execute operation is read out of the storage device 62, and the process moves to step S268 where a print request is sent to the network printer 300. The process moves to step S270 where the read-out print data is sent to the network printer 300. Thus, the process is returned to the former process by ending the series of process steps.

Meanwhile, at step S258, when there is no agreement in the authentication information (No), the process is returned to the former process by ending the series of process steps.

The power-save transit control process is now explained.

FIG. 10 is a flowchart showing the power-save transit control process.

The power-save transit control process is a process to cause the network printer 300 to transit into a power-save status. When executed in the CPU 50, the process first moves to step S300, as shown in FIG. 10.

At step S300, the process determines whether or not received status information. When status information has been received (Yes), the process moves to step S302. However, when not so (No), the process waits at S300 until receiving status information.

At step S302, the process determines whether or not the network printer 300 completed the printing. When the printing is completed (Yes), the process moves to step S304 where a power-save transit command is sent to the network printer 300. The process is returned to the former process by ending the series of process steps.

Meanwhile, at step S302, when the process determines that the printing is not completed (No), it is returned to the former process by ending the series of process steps.

The configuration of the network printer 300 is now explained.

Figure 11:
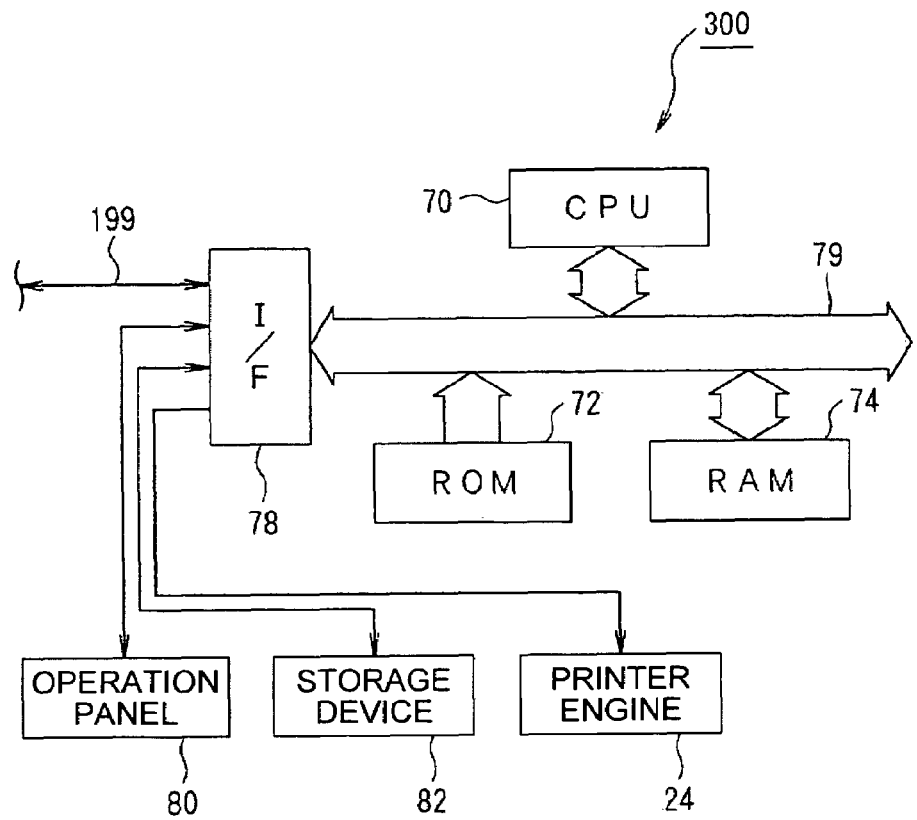
FIG. 11 is a block diagram showing a hardware arrangement of a network printer.

FIG. 11 is a block diagram showing a hardware arrangement of the network printer 300.

The network printer 300 is connected with a CPU 70, a ROM 72, a RAM 74 and an I/F 78 through a bus 79 similarly to the host terminal 100, as shown in FIG. 11. The I/F 78 is connected with an operation panel 80 made, such as by a touch panel, as a human interface for displaying a data input, a storage device 82, a printer engine 24 and a signal line for connection to the network 199.

Figure 12:
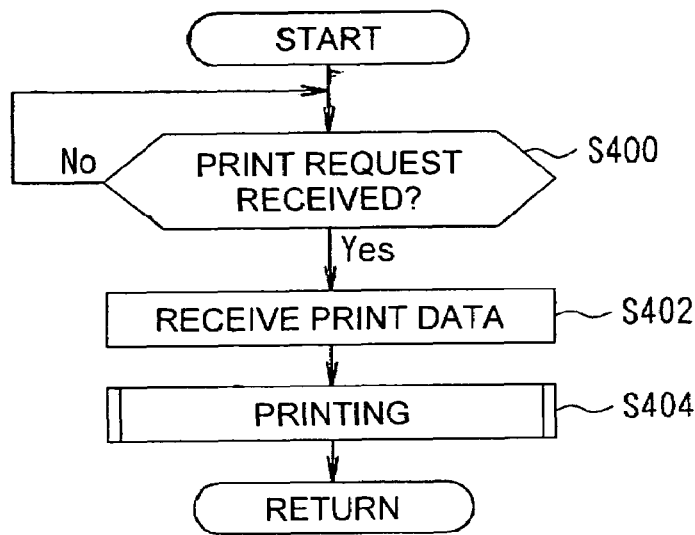
FIG. 12 is a flowchart showing a print control process.
Figure 13:
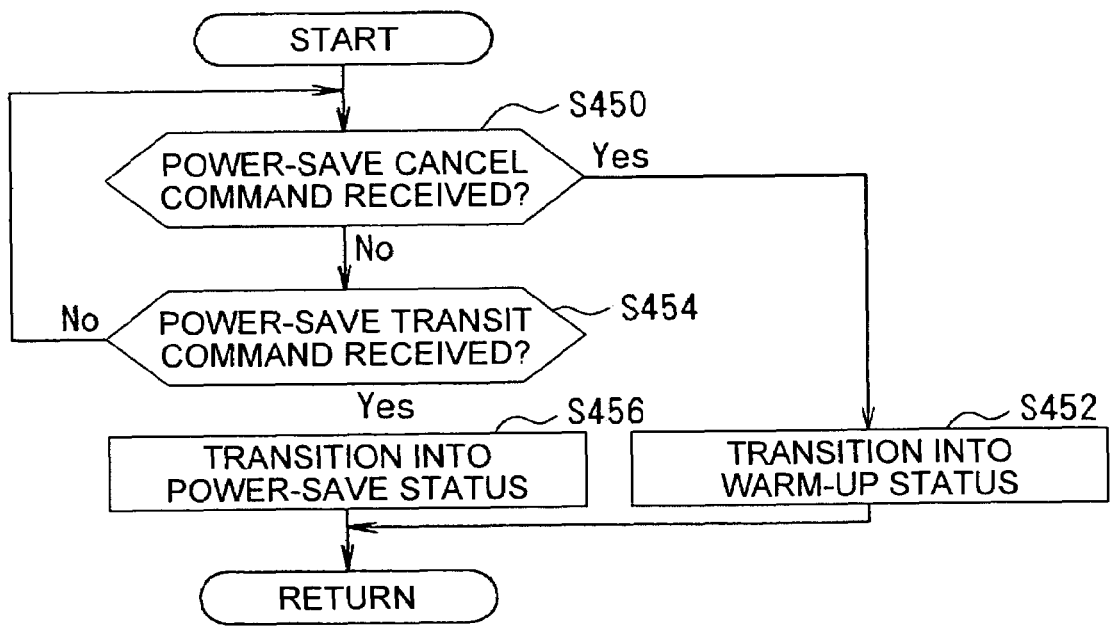
FIG. 13 is a flowchart showing a power-save process.

The CPU 70, configured by a micro-processing unit or the like, is to start up a predetermined program stored in a predetermined domain of the ROM 72 and execute time-divisionally the print control process and power save process shown in the flowcharts of FIGS. 12 and 13 according to the program.

The print control process is first explained.

FIG. 12 is a flowchart showing a print control process.

The print control process is a process to control a printing according to a print request from the user authentication apparatus 200. When executed in the CPU 70, the process first moves to step S400, as shown in FIG. 12.

At step S400, the process determines whether or not received a print request When a print request has been received (Yes), the process moves to step S402. However, when not so (No), the process waits at step S400 until receiving a print request.

At step S402, print data is received, and the process moves to step S404 where a printing is carried out by the printer engine 24 depending upon the received print data. The process is returned to the former process by ending the series of process steps.

The power save process is now explained.

FIG. 13 is a flowchart showing the power save process.

The power save process is a process to switch over between a power-save status and a warm-up status depending upon a power-save cancel instruction or power-save transit instruction of from the user authentication apparatus 200. When executed in the CPU 70, the process first moves to S450 as shown in FIG. 13.

At step S450, the process determines whether or not received a power-save cancel command. When a power-save cancel command has been received (Yes), the process moves to step S452 where the network printer 300 is transited into a warm-up status. The process is returned to the former process by ending the series of process steps.

Meanwhile, at step S450, when a power-save cancel command has not been received (No), the process moves to step S454 where the process determines whether or not received a power-save transit command. When a power-save transit command has been received (Yes), the process moves to step S456 where the network printer 300 is transited into a power-save status. The process is returned to the former process by ending the series of process steps.

Meanwhile, at step S454, when a power-save transit command has not been received (No), the process moves to step S450.

The operation of the present embodiment is now explained.

The user, at the host terminal 100, makes a request for printing by use of a document-production application, or the like.

At the host terminal 100, when there is a request for printing, document data is acquired through steps S102-S106. Based on the acquired document data, print data is generated to generate print attribute information. Through steps S110, S112, the generated print attribute information is attached to the print data and sent to the user authentication apparatus 200.

The user authentication apparatus 200, when receiving the print data, saves the received print data to the storage device 62 through steps S206, S208. The received print attribute information is registered in the print-job management table 420, with correspondence to the print data.

Then, the user, at the host terminal 100, inserts an authentication card in a card writer (not shown), to write authentication information to the authentication card by the card writer. Note that authentication information may be previously written on the authentication card, in which case a card writer need not be provided for the host terminal 100.

The user goes to the user authentication apparatus 200 and inserts the authentication card in the card reader 17.

The user authentication apparatus 200, when the authentication card is inserted, reads the authentication information out of the authentication card through steps S252-S256. The read-out authentication information is collated, to display an authentication result. In case authentication is obtained as a result of collation, a power-save cancel command is sent over to the network printer 300 through step S260.

The network printer 300, when receiving the power-save cancel command, transits a warm-up status from the power-save status through step S452 because it is in the power-save status unless printing has been effected immediately before.

Meanwhile, the user authentication apparatus 200, when obtaining an authentication, displays a list of print data corresponding to the user IDs contained in the read-out authentication information through step S262, to thereby receive a print job operation. The user, here, is allowed to select print data to be printed and input a print-execute operation.

At the user authentication apparatus 200, when a print-execute operation is inputted, the print data selected by the inputted print-execute operation is read out through steps S266-S270. The print data thus read is sent, together with a print request, to the network printer 300.

At the network printer 300, when receiving the print data together with the print request, printing is made based on the received print data through step S504. Meanwhile, the network printer 300 sends status information to the user authentication apparatus 200 at a regular time interval.

At the user authentication apparatus 200, when receiving the status information, the process determines whether or not completed the printing depending upon the received status information, through step S302. As a result, when the printing has been completed, a power-save transit command is sent to the network printer 300 through step S304.

The network printer 300, when receiving the power-save transit command, transits from the warm-up status into a power-save status through step S456.

Incidentally, in the case of utilizing an authentication card recording illicit authentication information, the user authentication apparatus 200 displays an authentication result that authentication is not obtainable, thus effecting no printing.

In this manner, in the present embodiment, the user authentication apparatus 200 is to read authentication information out of an authentication card and determines a usability of print data depending upon the read-out authentication information. When determined usable, a power-save cancel command is sent over to the network printer 300.

Due to this, because the network printer 300 is canceled from the power save status after the authentication, even in case the user is required to wait a time from a print data transmission up to completing an authentication, a power save status is maintained for this duration. Meanwhile, because the power save status is canceled before user's operation start, a printing can be started immediately. Accordingly, power consumption can be reduced as compared to the existing ones without increasing the time up to the start of printing.

Furthermore, in this embodiment, the user authentication apparatus 200, when status information is received and the printing is determined completed depending upon the received status information, sends a power-save transit command to the network printer 300.

Due to this, power consumption can be further reduced because of a transiting into a power save status immediately after completing the printing.

In the first embodiment, the user authentication apparatus 200 corresponds to the device management apparatus in form 2, 3, 16, 17, 20, 29, 42, 43, 58 or 59, the print-data storage section 14 and storage device 62 corresponds to the output-data storage section in form 1, 2, 16, 29 or 42 or the print-data storage section in form 57 or 58, the print-data saving section 16 and step S208 corresponds to the output-data saving section in form 1, 2 or 16 or the print-data saving section in form 57 or 58. Meanwhile, step S208 corresponds to the output-data saving step in form 29, 42, 43 or 44, the card reader 17 and step S252 corresponds to the authentication-information acquiring section in form 1, 2, 3, 16, 57, 58 or 59, and step S252 corresponds to the authentication-information acquiring step in form 29, 42, 43 or 44.

Meanwhile, in the first embodiment, the user authentication section 18 and step S254, S258 corresponds to the usability determining section in form 1 to 4, 16, 17 or 57 to 60, step S254, S258 corresponds to the usability determining step in form 29, 30, 42, 43 to 44, the print-data transmitting section 20, I/F 58 and step S270 corresponds to the output-data transmitting section in form 1, 2 or 16 or the print-data transmitting section in form 57 or 58. Meanwhile, step S270 corresponds to the output-data transmitting step in form 29, 42 or 43, the status-information receiving section 21, I/F 58 and step S300 corresponds to the output-completion detecting section in form 7, 20 or 63, and step S300 corresponds to the output-completion detecting step in form 33 or 48.

Meanwhile, in the first embodiment, the power control section 22 and steps S260, S304 corresponds to the power control section in form 1 to 4, 7, 16, 17, 20, 57 to 60 or 63, and step S260, S304 corresponds to the power control step in form 29, 30, 33, 42, 43 to 45 or 48. Meanwhile, the network printer 300 corresponds to the network device in form 2, 16, 20, 29, 33 or 43, or the network printer in form 58, the print-data receiving section 23, I/F 78 and step S402 corresponds to the output-data receiving section in form 1, 2, 57 or 58, and step S402 corresponding to the output-data receiving step in form 42 or 43.

Meanwhile, in the first embodiment, the printer engine 24 and step S404 corresponds to the printing section in form 2 or 7, or the printing section in form 58 or 63, step S404 corresponds to the output step in form 43 or 48, the power-save section 26 and step S452, S456 corresponds to the power-save switchover section in form 2, 7, 58 or 63. Meanwhile, step S452, S456 corresponding to the power save in form 43 or 48.

A second embodiment of the invention is now explained.

This embodiment is different from the first embodiment in that a power-save cancel command is to be sent when an authentication is obtained and the print data concerned is present. Note that, in the following, description is only on the differences from the first embodiment, to omit the explanations of the overlaps with the first embodiment by attaching the same reference numbers.

Figure 14:
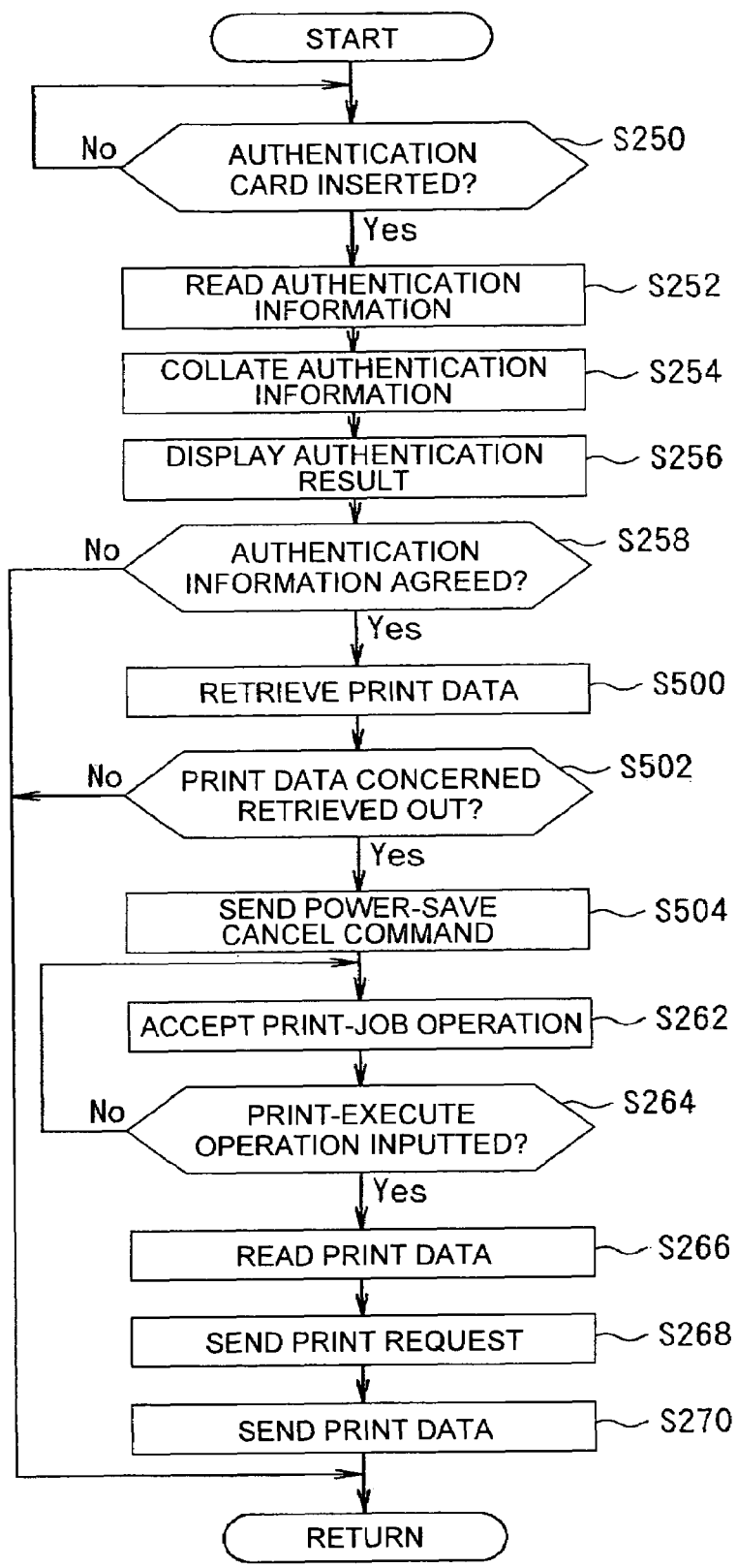
FIG. 14 is a flowchart showing a user authentication process.

The CPU 50 executes a user authentication process shown in a FIG. 14 flowchart in place of the user authentication process shown in the FIG. 9 flowchart.

FIG. 14 is a flowchart showing the user authentication process.

In case the user authentication process is executed in the CPU 50, the process first moves to step S258 through steps S250-S256 as shown in FIG. 14.

At step S258, when it is determined that there is an agreement in the authentication information (Yes), the process moves to step S500 where the print data corresponding to the user ID contained in the read-out authentication information is retrieved from the print-job management table 420, and the process moves to step S502.

At step S502, the process determines whether or not retrieved for the print data concerned. When it is determined that the print data concerned is retrieved out (Yes), the process moves to step S504 where a power-save cancel command is sent to the network printer 300 and the process moves to step S262. The process at step S262 and subsequent is similar to the user authentication process shown in the FIG. 9 flowchart.

Meanwhile, at step S502, when it is determined that the print data concerned is not retrieved out (No), the process is returned to the former process by ending the series of process steps.

The operation of this embodiment is now explained.

The user goes to the user authentication apparatus 200 and inserts an authentication card in the card reader 17.

At the user authentication apparatus 200, when the authentication card is inserted, the authentication information is read out of the authentication card and the read-out authentication information is collated to display an authentication result through steps S252-S256. In case an authentication is obtained as a result of collation, retrieval is made for the print data corresponding to the user ID contained in the read-out authentication information through step S500. As a result, in case the print data concerned is retrieved out, a power-save cancel command is sent to the network printer 300 through step S504.

The network printer 300, when receiving the power-save cancel command, transits a warm-up status from the power-save status through step S452 because it is in the power-save status unless printing has been effected immediately before.

In this manner, in this embodiment, the user authentication apparatus 200 is not to send a power-save cancel command when not retrieved out the print data concerned despite determined usable.

Due to this, when there is no print data concerned even if authenticated, the power-save status is maintained. Thus, power consumption can be further reduced as compared to the first embodiment.

Furthermore, in this embodiment, the user authentication apparatus 200 is to send a power-save cancel command when determined usable and the print data concerned is retrieved out.

Due to this, because the power-save status can be canceled only when an authentication is obtained and there is the print data concerned, power consumption can be further reduced as compared to the first embodiment.

In the second embodiment, step S500 corresponds to the output-data retrieval section in form 5 or 18, the output-data retrieval step in form 31 or 46 or the print-data retrieval section in form 61, and step S504 corresponding to the power control section in form 5, 18 or 61, or the power control step in form 31 or 46.

A third embodiment of the invention is now explained.

This embodiment is different from the first embodiment in that a power-save cancel command is to be sent when an authentication is obtained and the unprocessed print data is present.

Figure 15:
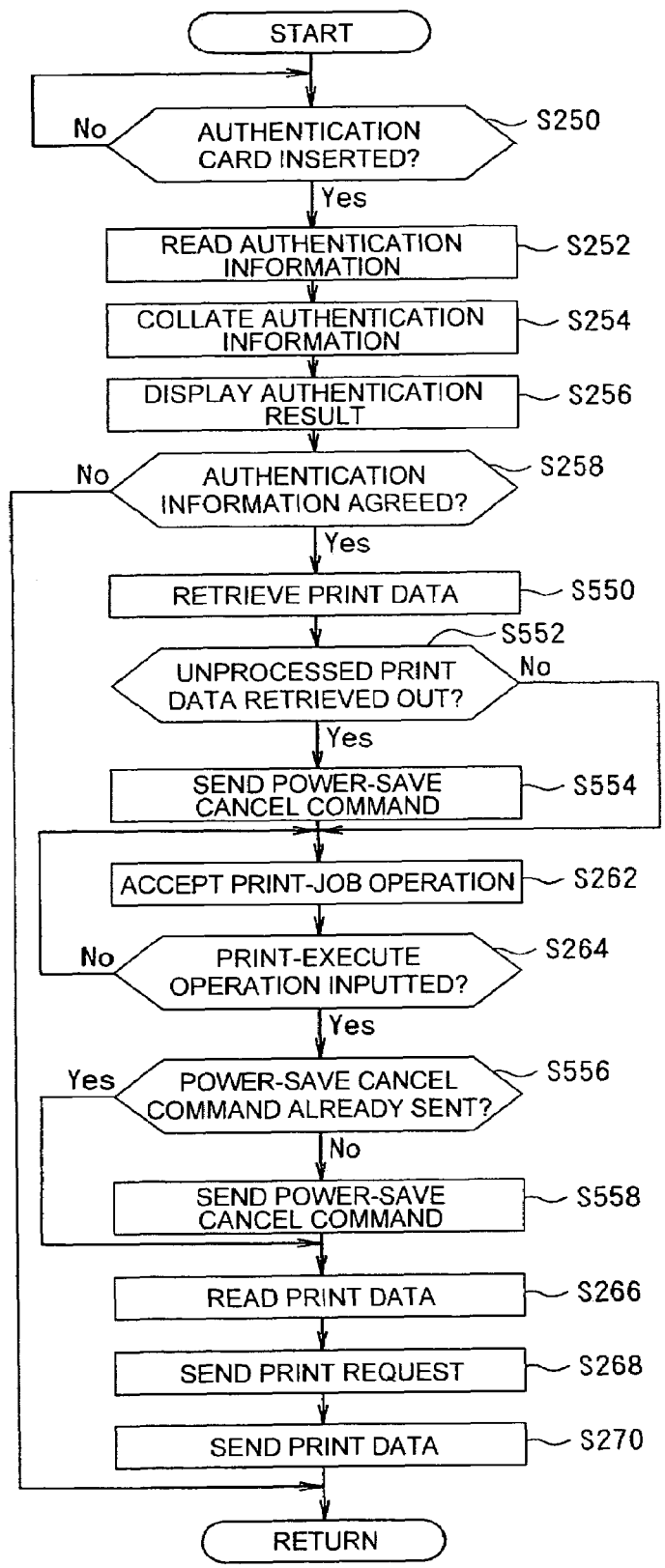
FIG. 15 is a flowchart showing a user authentication process.

The CPU 50 executes a user authentication process shown in a FIG. 15 flowchart in place of the user authentication process shown in the FIG. 9 flowchart.

FIG. 15 is a flowchart showing the user authentication process.

In case the user authentication process is executed in the CPU 50, the process first moves to step S258 through steps S250-S256 as shown in FIG. 15.

At step S258, when it is determined that there is an agreement in the authentication information (Yes), the process moves to step S550 where the unprocessed print data, corresponding to the user ID contained in the read-out authentication information, is retrieved from the print-job management table 420, and the process moves to step S552.

At step S552, the process determines whether or not unprocessed print data has been retrieved out. When it is determined that unprocessed print data has been retrieved out (Yes), the process moves to step S554 where a power-save cancel command is sent to the network printer 300 and the process moves to step S264 through step S262.

At step S264, when there is an input of a print-execute operation (Yes), the process moves to step S556 where it determines whether or not a power-save cancel command has been sent. When a power-save cancel command has not been sent (No), the process moves to step S558 where a power-save cancel command is sent to the network printer 300 and the process moves to step S266. The process at step S266 and subsequent is similar to the user authentication process shown in the FIG. 9 flowchart.

Meanwhile, at step S556, when a power-save cancel command has been sent (Yes), the process moves to step S266.

Meanwhile, at step S552, when unprocessed print data has not been retrieved out (No), the process moves to step S262.

The operation of this embodiment is now explained.

The user goes to the user authentication apparatus 200 and inserts an authentication card in the card reader 17.

At the user authentication apparatus 200, when the authentication card is inserted, authentication information is read out of the authentication card through steps S252-S256. The read-out authentication information is collated, to display an authentication result. In case an authentication is obtained as a result of collation, retrieval is made for unprocessed print data corresponding to the user ID contained in the read-out authentication information through step S550. As a result, in case unprocessed print data is retrieved out, a power-save cancel command is sent to the network printer 300 through step S554.

The network printer 300, when receiving the power-save cancel command, transits into a warm-up status from the power-save status through step S452 because it is in the power-save status unless printing has been effected immediately before.

Incidentally, in case a print-execute operation is inputted as to the print data that data concerned is present but printing has been made once or more, a power-save cancel command is not yet sent. Accordingly, a power-save cancel command is sent to the network printer 300 through step S558.

In this manner, in this embodiment, when the user authentication apparatus 200 is determined usable for use and the concerned unprocessed print data is retrieved out, a power-save cancel command is sent.

Due to this, in the case an authentication is obtained and unprocessed print data is present, there is a high possibility to carry out printing. In case the power-save status is cancelled limitedly in such a case, power consumption can be further reduced as compared to the first embodiment.

In the third embodiment, step S550 corresponds to the output-data retrieval section in form 6 or 19, the output-data retrieval step in form 32 or 47 or the print-data retrieval section in form 62, and step S554 corresponds to the power control section in form 6, 19 or 62 and the power control step in form 32 or 47.

A fourth embodiment of the invention is now explained.

This embodiment is different from the first embodiment in that a power-save transit command is to be sent in the case print data is deleted.

Figure 16:
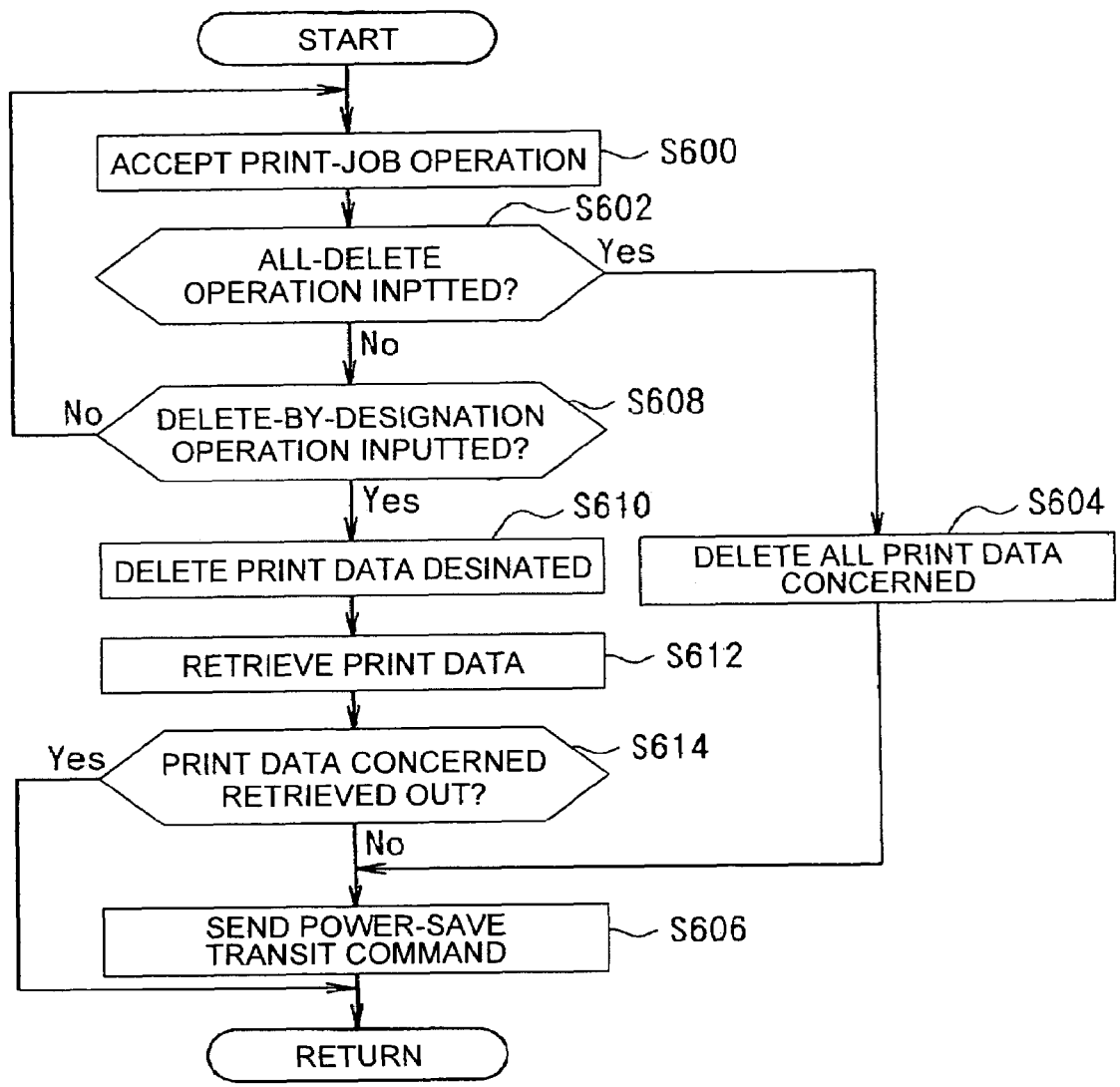
FIG. 16 is a flowchart showing a power-save transit control process.

The CPU 50 executes a power-save transit control process shown in a FIG. 16 flowchart in place of the power-save transit control process shown in the FIG. 10 flowchart.

FIG. 16 is a flowchart showing the power-save transit control process.

The power-save transit control process is a process to be executed after obtaining an authentication. When executed in the CPU 50, the process moves to step S600 as shown in FIG. 16.

At step S600, a print job operation is accepted similarly to the process at step S262. The process moves to step S602 where it determines whether or not there is an input of an all-delete operation. When there is an input of an all-delete operation (Yes), the process moves to step S604.

At step S604, all the print data corresponding to the user ID included in the read-out authentication information is deleted from the storage device 62 on the basis of the print-job management table 420, and the process moves to step S606.

At step S606, a power-save transit command is sent to the network printer 300. At this time, when the network printer 300 is currently under printing, a power-save transit command is sent after waiting for a completion of the printing. Whether or not the printing is completed can be determined by a process similar to the process at steps S300-S304.

When the process at step S606 is ended, the process is returned to the former process by ending the series of process steps.

Meanwhile, at step S602, when there is no input of an all-delete operation (No), the process moves to step S608 where it determines whether or not there is an input of a delete-by-designation operation. When there is an input of a delete-by-designation operation (Yes), the process moves to step S610 where the print data selected by the delete-by-designation operation is deleted from the storage device 62, and the process moves to step S612.

At step S612, the print-data corresponding to the user ID contained in the read-out authentication information is deleted out of those of the print-job management table 420. The process moves to step S614 where it determines whether or not print data concerned is retrieved out. When print data concerned is not retrieved out (No), the process moves to step S606.

Meanwhile, at step S614, when print data concerned is retrieved out (Yes), the process is returned to the former process by ending the series of process steps.

Meanwhile, at step S608, when there is no input of a delete-by-designation operation (No), the process moves to step S600.

The operation of the present embodiment is now explained.

Explained first is the case that the user inputs an all-delete operation.

The user at the user authentication apparatus 200 inputs an all-delete operation after obtaining an authentication.

At the user authentication apparatus 200, when an all-delete operation is inputted, all the print data corresponding to the user ID contained in the read-out authentication information is deleted through steps S604, S606, and a power-save transit command is sent to the network printer 300.

The network printer 300, when receiving the power-save transit command, transits from a warm-up status into a power-save status through step S456.

Now explained is the case that the user inputs a delete-by-designation operation.

The user at the user authentication apparatus 200 selects print data to be deleted and inputs a delete-by-designation operation.

At the user authentication apparatus 200, when there is an input of a delete-by-designation operation, the print data selected by the inputted delete-by-designation operation is deleted through steps S610, S612, to retrieve for the print data corresponding to the user IC contained in the read-out authentication information. As a result, in case print data concerned is not retrieved out, a power-save transit command is sent to the network printer 300 through step S606. Contrary to this, in case print data concerned is retrieved out, no power-save transit command is sent.

In this manner, in this embodiment, the user authentication apparatus 200 is to send a power-save transit command when the print data is deleted.

Due to this, in the case the print data is deleted, there is a low possibility to carry out a printing continuously. In such a case, in case a transition is made into a power-save status, power consumption can be further reduced without increasing the time up to a printing start, as compared to the first embodiment.

Furthermore, in this embodiment, the user authentication apparatus 200 is to send a power-save transit command when determining that there is no print data related to the deleted print data.

Due to this, in the case that the print data is deleted and the related print data is not present, there is further low possibility to carry out a printing continuously. In such a case, by a transition into a power-save status, power consumption can be further reduced without increasing the time up to a printing start.

In the fourth embodiment, steps S604, S610 correspond to the output-data deleting section in form 12, 13, 25 or 26, the output-data deleting step in form 38, 39, 53 or 54 or the print-data deleting section in form 68 or 69, while step S606 corresponds to the power control section in form 12, 13, 25, 26, 68 or 69, or the power control step in form 38, 39, 53 or 54. Meanwhile, step S614 corresponds to the output-data existence determining section in form 13 or 26, the output-data existence determining step in form 39 or 54, or the print-data existence determining section in form 69.

A fifth embodiment of the invention is now explained.

This embodiment is different from the first embodiment in that a power-save transit command is sent in the case authentication acceptance becomes available.

Figure 17:
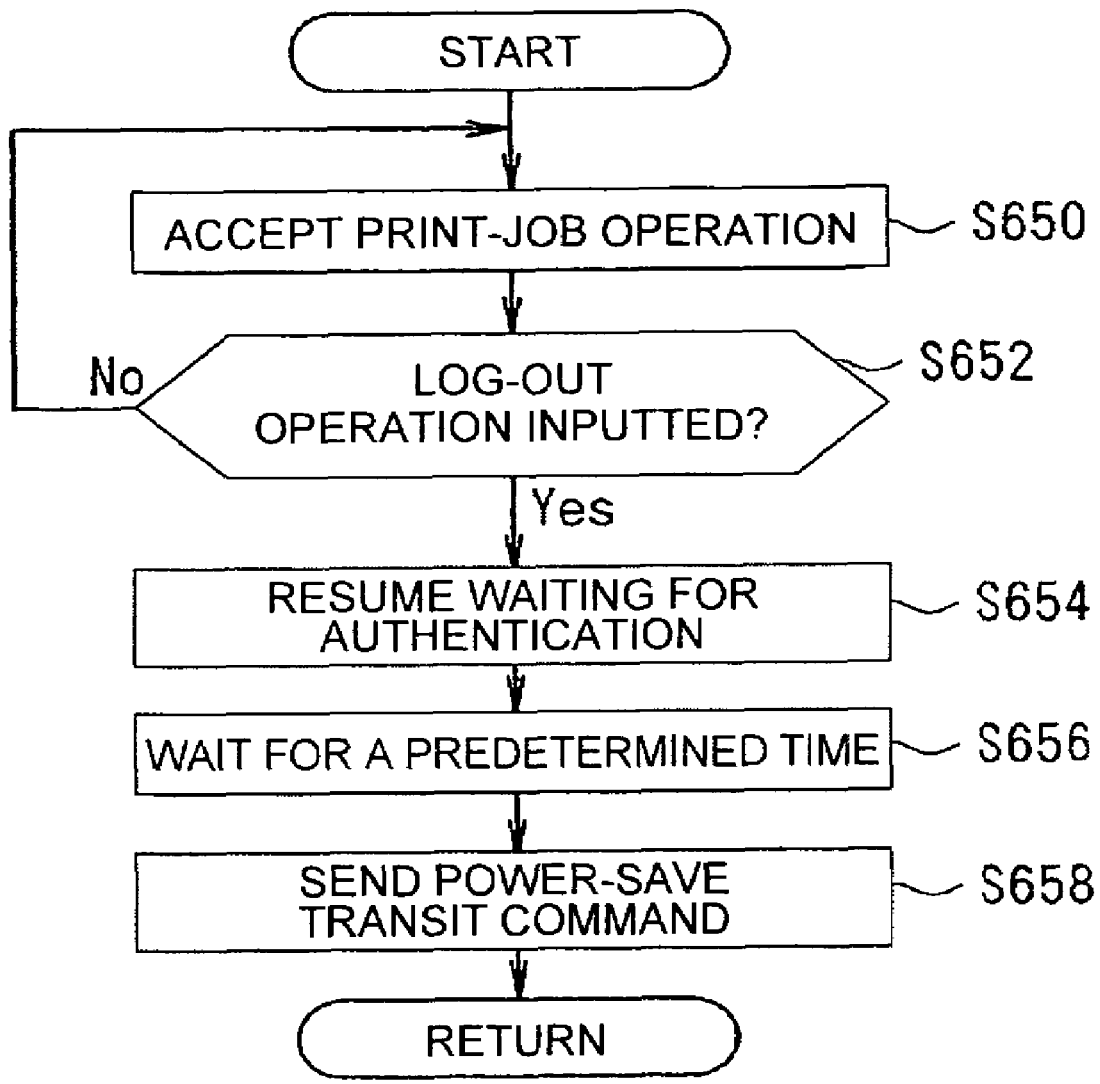
FIG. 17 is a flowchart showing a power-save transit control process.

The CPU 50 executes a power-save transit control process shown in a FIG. 17 flowchart in place of the power-save transit control process shown in the FIG. 10 flowchart.

FIG. 17 is a flowchart showing the power-save transit control process.

The power-save transit control process is a process to be executed after obtaining an authentication. When executed in the CPU 50, the process first moves to step S650 as shown in FIG. 17.

At step S650, a print job operation is accepted similarly to the process at step S262. The process moves to step S652 where it determines whether or not there is an input of a log-out operation. When there is an input of a log-out operation (Yes), the process moves to step S654.

At step S654, a waiting for authentication capable of reading authentication information out of the authentication card is resumed, and the process moves to step S656 where the process waits for a predetermined time previously set, and the process moves to step S658.

At step S658, a power-save transit command is sent to the network printer 300. At this time, when the network printer 300 is currently under printing, a power-save transit command is sent after waiting for a completion of the printing. Whether or not the printing is completed can be determined by a process similar to the process of steps S300-S304.

When the process at step S658 is ended, the process is returned to the former process by ending the series of process steps.

Meanwhile, at step S652, when there is no input of a log-out operation (No), the process moves to step S650.

The operation of the present embodiment is now explained.

The user at the user authentication apparatus 200 inputs a log-out operation after obtaining an authentication.

At the user authentication apparatus 200, when a log-out operation is inputted, a waiting for authentication is resumed through steps S654-S658. A power-save transit command is sent to the network printer 300 after waiting the passage of a predetermined time.

The network printer 300, when receiving the power-save transit command, transits from a warm-up status into a power-save status through step S456.

In this manner, in this embodiment, the user authentication apparatus 200 is to transmit a power-save transit command when determining that a printing is completed and a log-out operation is inputted.

Due to this, in the case that a printing is completed and a log-out operation is inputted, there is a low possibility to carry out a printing continuously therewith. In such a case, in case a transition is made into a power-save status, power consumption can be further reduced without increasing the time up to a printing start.

Furthermore, in this embodiment, the user authentication apparatus 200 is to send a power-save transit command when determining that a printing is completed and a waiting for authentication is resumed.

Due to this, in the case a printing is completed and a wait for authentication is resumed, there is a low possibility to carry out a printing continuously. In such a case, in case a transition is made into a power-save status, power consumption can be further reduced without increasing the time up to a printing start.

In the fifth embodiment, step S652 corresponds to the operation-completion detecting section in form 8, 21 or 64, or the operation-completion detecting step in form 34 or 49, and step S654 corresponds to the determinable-status detecting section in form 9, 22 or 65, or the determinable-status detecting step in form 35 or 50. Meanwhile, step S658 corresponds to the power control section in form 8, 9, 21, 22, 64 or 65, the output-completion detecting section in form 8, 9, 21 or 22, the printing-completion detecting section in form 64 or 65, the power control step in form 34, 35, 49 or 50, or the output-completion detecting step in form 34, 35, 49 or 50.

A sixth embodiment of the invention is now explained.

This embodiment is different from the first embodiment in that a power-save transit command is to be sent in the case authentication acceptance becomes available.

Figure 18:
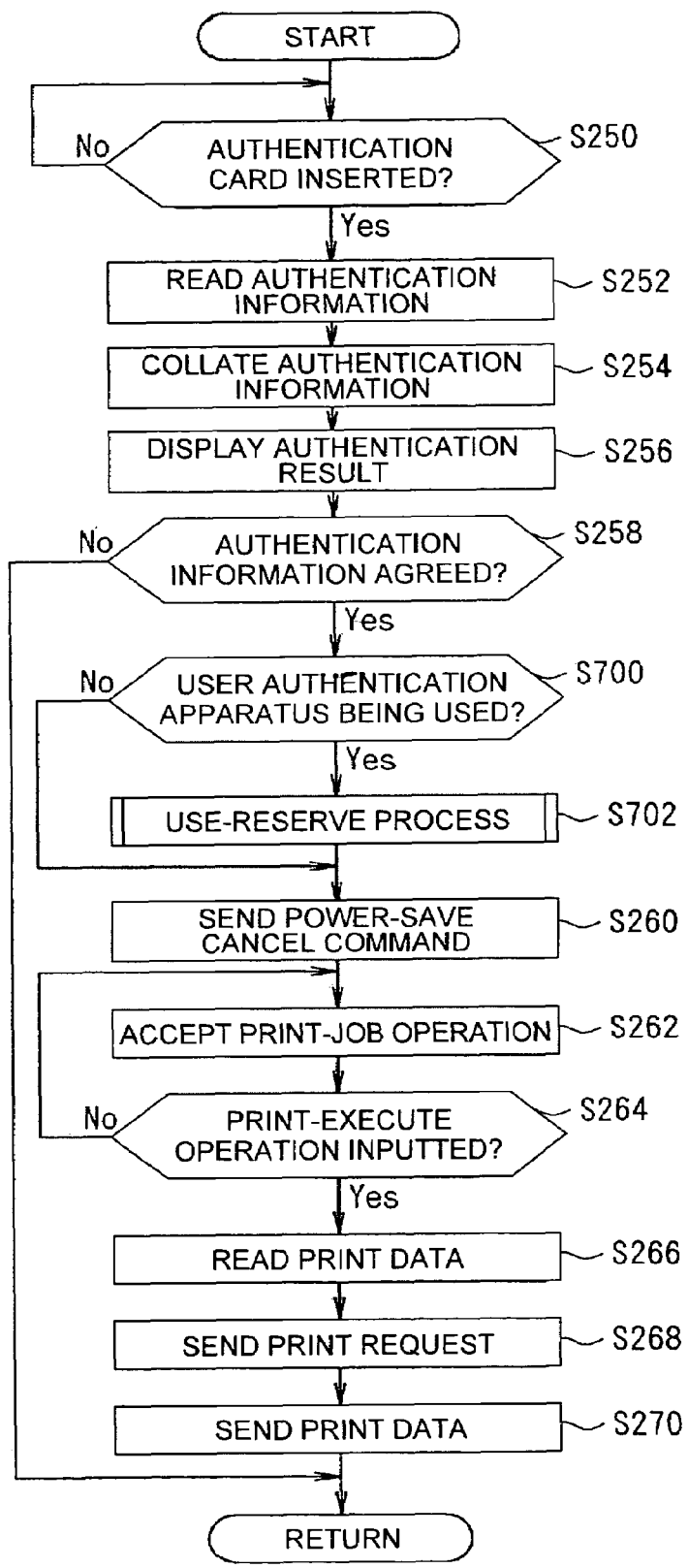
FIG. 18 is a flowchart showing a user authentication process.

The CPU 50 executes a user authentication process shown in a FIG. 18 flowchart in place of the user authentication process shown in the FIG. 9 flowchart. Meanwhile, it executes a power-save transit control process shown in a FIG. 19 flowchart in place of the power-save transit control process shown in the FIG. 10 flowchart.

First explained is a user authentication process.

FIG. 18 is a flowchart showing the user authentication process.

In case the user authentication process is executed in the CPU 50, the process first moves to step S258 through steps S250-S256 as shown in FIG. 18.

At step S258, when it is determined that there is an agreement in the authentication information (Yes), the process moves to step S700 where it determines whether or not the user authentication apparatus 200 is being used by another user. When the user authentication apparatus 200 is being used (Yes), the process moves to step S702.

At step S702, the process executes a use-reserve process for causing a user authentication process for the user who currently inserted an authentication card to wait, and the process moves to step S260. The process at step S260 and subsequent is similar to the user authentication process shown in the FIG. 9 flowchart.

Meanwhile, at step S700, when the user authentication apparatus 200 is not being used (No), the process moves to step S260.

The power-save transit control process is now explained.

Figure 19:
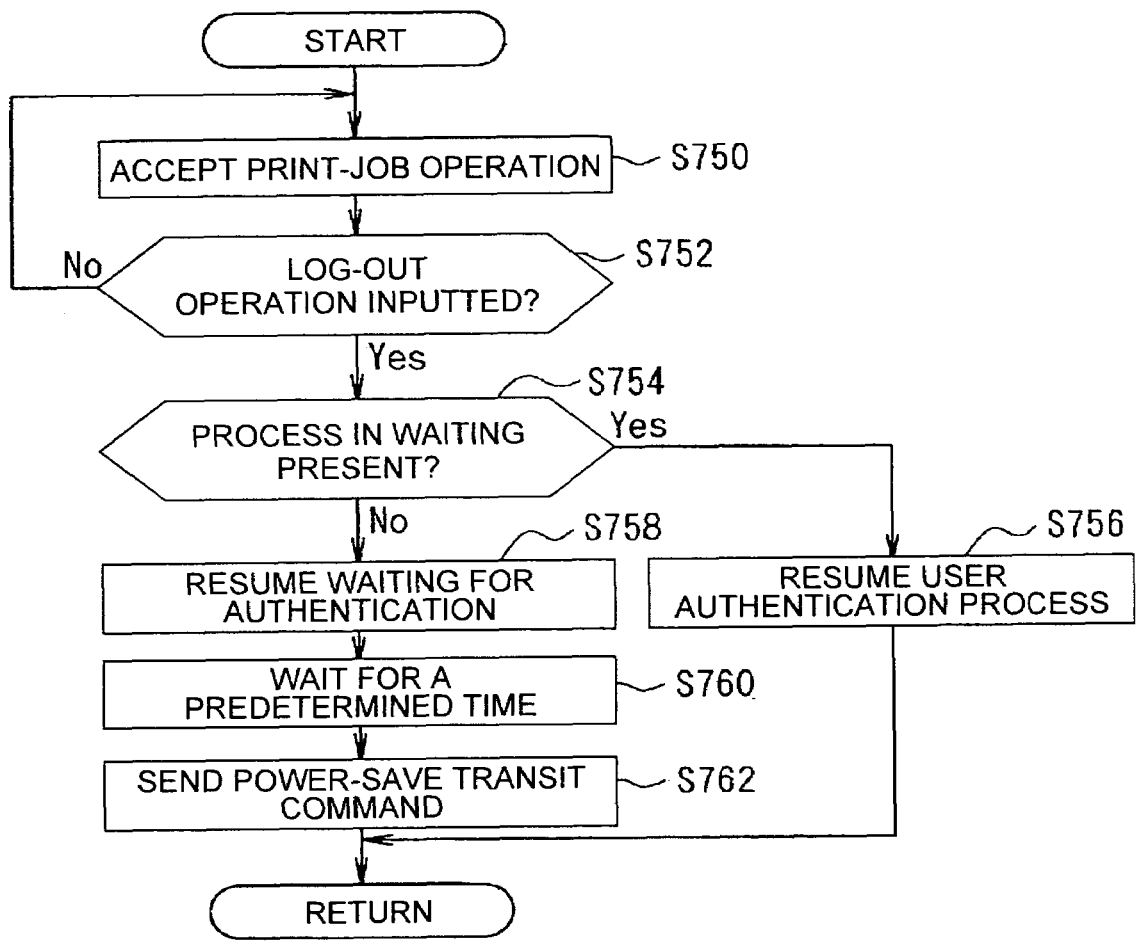
FIG. 19 is a flowchart showing a power-save transit control process.

FIG. 19 is a flowchart showing a power-save transit control process.

The power-save transit control process is a process to be executed after obtaining an authentication. In cased executed in the CPU 50, the process first moves to step S750 as shown in FIG. 19.

At step S750, a print-job operation is accepted similarly to the process at step S262. The process moves to step S752 where it determines whether or not there is an input of a log-out operation. When a log-out operation is inputted (Yes), the process moves to step S754.

At step S754, the process determines whether or not there is a user authentication process in waiting. When there is a user authentication process in waiting (Yes), the process moves to step S756 where the user authentication process in waiting is resumed. The process is returned to the former process by ending the series of process steps.

Meanwhile, at step S754, when there is no user authentication process in waiting (No), the process moves to step S758 where a waiting for authentication reception capable of reading authentication information out of the authentication card is resumed. The process moves to step S760 where it waits for a predetermined time previously set, and the process moves to step S762.

At step S762, a power-save transit command is sent to the network printer 300. At this time, when the network printer 300 is currently under printing, a power-save transfer command is sent after waiting for a completion of the printing. Whether or not the printing is completed can be determined by a process similar to the process at steps S300-S304.

After completing the process at step S762, the process is returned to the former process by ending the series of process steps.

Meanwhile, at step S752, when there is no input of a log-out operation (No), the process moves to step S750.

The operation of this embodiment is now explained.

The user goes to the user authentication apparatus 200 and inserts an authentication card in the card reader 17.

At the user authentication apparatus 200, when the authentication card is inserted, authentication information is read out of the authentication card through steps S252-S256. The read-out authentication information is collated, to display an authentication result. In case an authentication is obtained as a result of collation, the process determines whether or not the user authentication apparatus 200 is now being used through step S700. As a result, in case the user authentication apparatus 200 is now being used, the user authentication process is caused to wait through step S702 which is for the user who currently inserted the authentication card through step S702. In case the user who is now using the user authentication apparatus 200 inputs a log-out operation, the user authentication process in waiting is resumed through step S756 without sending a power-save transfer command because there is a user authentication process in waiting.

Contrary to this, in case there is no user authentication process in waiting, a waiting for authentication is resumed through steps S758-S762. After waiting the passage of a predetermined time, a power-save transit command is sent to the network printer 300.

The network printer 300, when receiving the power-save transfer command, transits from a warm-up status into a power-save status through step S456.

In this manner, in this embodiment, when there is a user authentication process in waiting even if inputting a log-out operation, the user authentication apparatus 200 does not send a power-save cancel command.

Due to this, in the case when there is a user authentication process in waiting even if inputting a log-out operation, there is a high possibility to carry out a printing continuously. In such a case, maintaining the power-save status makes it possible to reduce the time up to a printing start.

In the sixth embodiment, step S752 corresponds to the operation-completion detecting section in form 8, 21 or 64, or the operation-completion detecting step in form 34 or 49, and step S758 corresponds to the determinable-status detecting section in form 9, 22 or 65, or the determinable-status detecting step in form 35 or 50. Meanwhile, step S762 corresponds to the power control section in form 8, 9, 21, 22, 64 or 65, the output-completion detecting section in form 8, 9, 21 or 22, the print-process completion detecting section in form 64 or 65, the power control step in form 34, 35, 49 or 50, or the output-completion detecting step in form 34, 35, 49 or 50.

A seventh embodiment of the invention is now explained.

This embodiment is different from the first embodiment in that a power-save transit command is sent in the case authentication acceptance becomes available.

The user authentication apparatus 200 further including an objective sensor which is for detecting a person existing in front of the user authentication apparatus 200.

Figure 20:
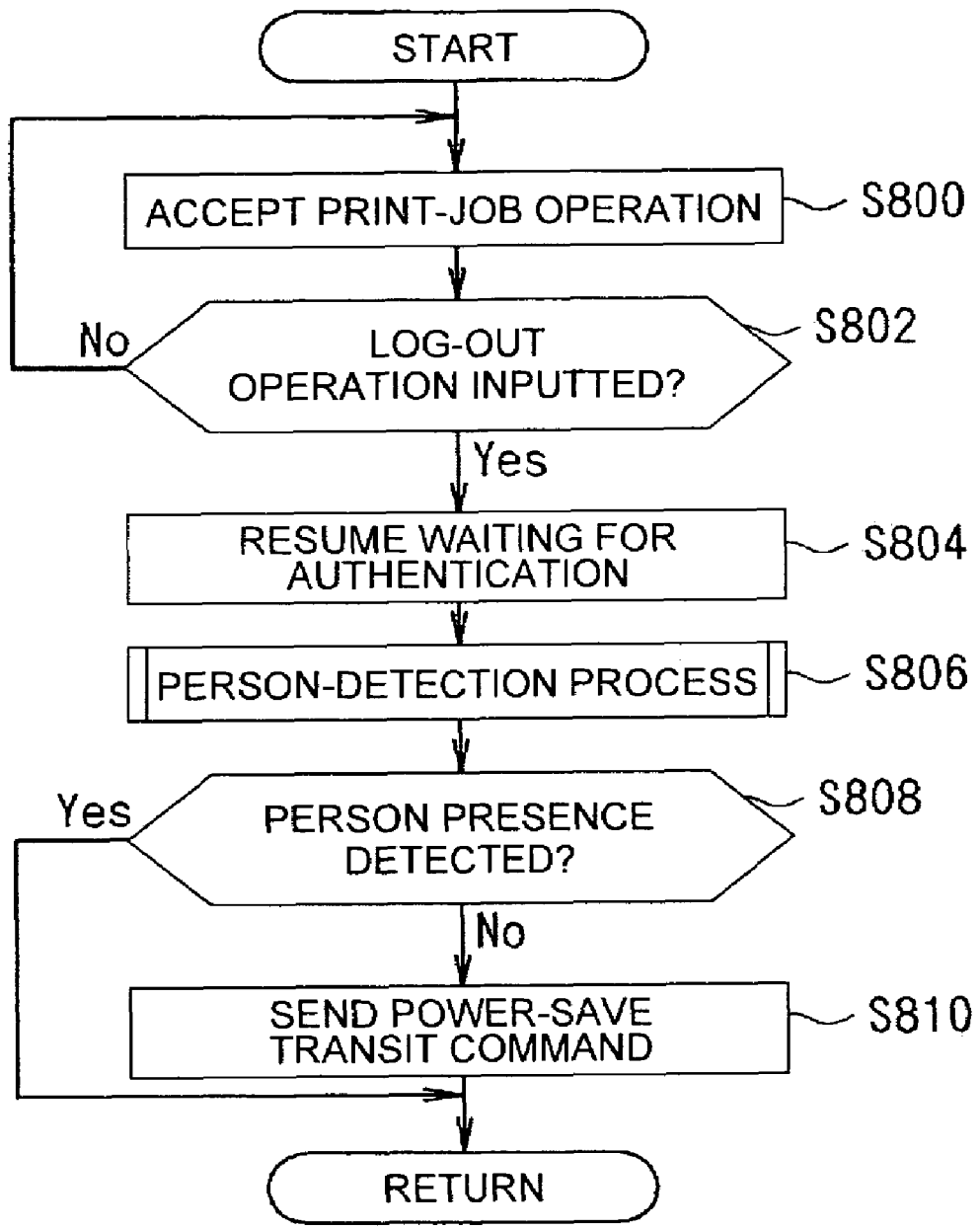
FIG. 20 is a flowchart showing a power-save transit control process.

The CPU 50 executes a power-save transit control process shown in a FIG. 20 flowchart in place of power-save transit control process shown in the FIG. 10 flowchart.

FIG. 20 is a flowchart showing a power-save transit control process.

The power-save transit control process is a process to be executed after obtaining an authentication. When executed in the CPU 50, the process first moves to step S800 as shown in FIG. 20.

At step S800, a print job operation is accepted similarly to the process at step S262. The process moves to step S802 where it determines whether or not there is an input of a log-out operation. When there is an input of a log-out operation (Yes), the process moves to step S804.

At step S804, a waiting for authentication capable of reading authentication information out of the authentication card is resumed. The process moves to step S806 where it executes a person-detection process that is to detect a person by the objective sensor, and the process moves to step S808.

At step S808, the process determines whether or not a person's presence is detected by the objective sensor. When a person's presence is not detected (No), the process moves to step S810.

At step S810, a power-save transit command is sent to the network printer 300. At this time, when a printing is under processing at the network printer 300, a power-save transit command is sent after waiting for a completion of the printing. Whether or not the printing is completed can be determined by a process similar to the process of steps S300-S304.

When the process at step S810 is ended, the process is returned to the former process by ending the series of process steps.

Meanwhile, at step S808, when a person's presence is detected (Yes), the process is returned to the former process by ending the series of process steps.

Meanwhile, at step S802, when there is no input of a log-out operation (No), the process moves to step S800.

The operation of the present embodiment is now explained.

The user, at the user authentication apparatus 200, inputs a log-out operation after obtaining an authentication.

At the user authentication apparatus 200, in case there is an input of a log-out operation, a waiting for authentication is resumed through steps S804-S808, to determine whether or not a person's presence is detected by the objective sensor. In the case the next user is waiting in front of the user authentication apparatus 200, the person's presence is detected by the objective sensor. In the case a person's presence is detected, no power-save transit command is sent.

Contrary to this, in case no person's presence is detected, a power-save transit command is sent to the network printer 300 through step S810.

The network printer 300, when receiving the power-save transit command, transits from the warm-up status into a power-save status through step S456.

In this manner, in this embodiment, the user authentication apparatus 200 is not to send a power-save transit command when a person's presence is detected by the objective sensor even if there is an input of a log-out operation.

Due to this, in the case there is the next user in front of the user authentication apparatus 200 even if there is an input of a log-out operation, there is a high possibility to carry out a printing continuously. In such a case, maintaining the power-save status makes it possible to reduce the time up to a printing start.

In the seventh embodiment, step S802 corresponds to the operation-completion detecting section in form 8, 21 or 64, or the operation-completion detecting step in form 34 or 49, and step S804 corresponds to the determinable-status detecting section in form 9, 22 or 65, or the determinable-status detecting step in form 35 or 50. Meanwhile, step S810 corresponds to the power control section in form 8, 9, 21, 22, 64 or 65, the output-completion detecting section in form 8, 9, 21 or 22, the print-process completion detecting section in form 64 or 65, the power control step in form 34, 35, 49 or 50, or the output-completion detecting step in form 34, 35, 49 or 50.

An eighth embodiment of the invention is now explained.

This embodiment is different from the first embodiment in that a power-save transit command is sent in the case authentication acceptance becomes available.

Figure 21:
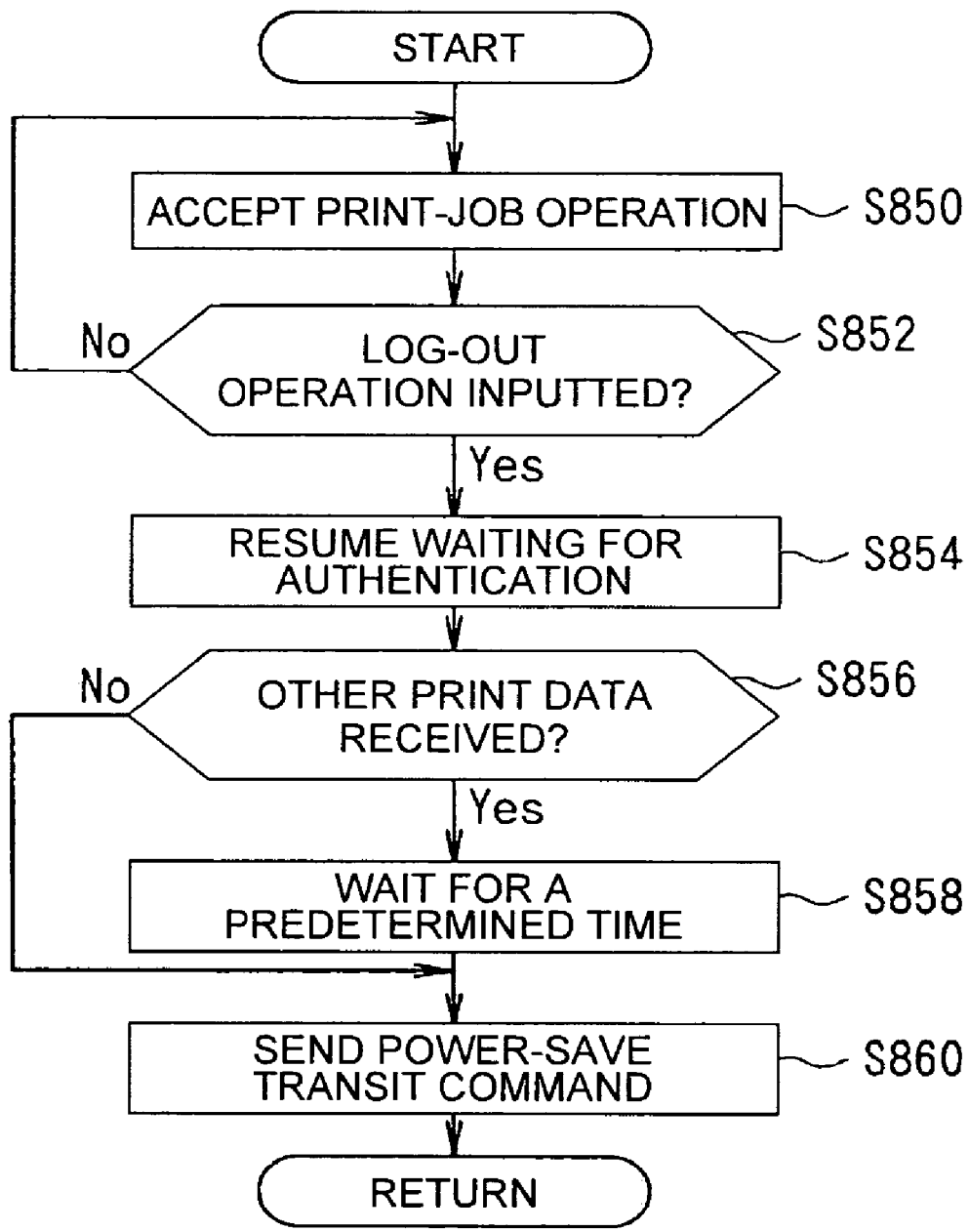
FIG. 21 is a flowchart showing a power-save transit control process.

The CPU 50 executes a power-save transit control process shown in a FIG. 21 flowchart in place of the power-save transit control process shown in the FIG. 10 flowchart.

FIG. 21 is a flowchart showing a power-save transit control process.

The power-save transit control process is a process to be executed after obtaining an authentication. When executed in the CPU 50, the process first moves to step S850 as shown in FIG. 21.

At step S850, a print job operation is accepted similarly to the process at step S262. The process moves to step S852 where it determines whether or not there is an input of a log-out operation. When there is an input of a log-out operation (Yes), the process moves to step S854.

At step S854, a waiting for authentication capable of reading authentication information out of the authentication card is resumed. The process moves to step S856 where it determines whether or not another print data is received in the user authentication process. When another print data is received (Yes), the process moves to step S858 where it waits for a predetermined time previously set, and the process moves to step S860.

At step S860, a power-save transit command is sent to the network printer 300. At this time, when a printing is under processing at the network printer 300, a power-save transit command is sent after waiting for a completion of the printing. Whether or not the printing is completed can be determined by a process similar to the process of steps S300-S304.

When the process at step S860 is ended, the process is returned to the former process by ending the series of process steps.

Meanwhile, at step S856, when there is no reception of another print data (No), the process moves to step S860.

Meanwhile, at step S852, when there is no input of a log-out operation (No), the process moves to step S850.

The operation of the present embodiment is now explained.

The user at the user authentication apparatus 200 inputs a log-out operation after obtaining an authentication.

At the user authentication apparatus 200, when a log-out operation is inputted, a waiting for authentication is resumed through steps S854-S858, to determine whether or not received another of print data during a user authentication processing. As a result, when determining received another of print data, a power-save transit command is sent to the network printer 300 through steps S858, S860 by waiting the passage of a predetermined time.

The network printer 300, when receiving the power-save transit command, transits from a warm-up status into a power-save status through step S456.

Contrary to this, when no other print data is received, a power-save transit command is immediately sent to the network printer 300 through step S860.

In this manner, in this embodiment, the user authentication apparatus 200 is to immediately send a power-save transit command when there is an input of a log-out operation and no other print data is received during a user authentication process.

Due to this, in the case that a log-out operation is inputted and no other print data is received, there is a low possibility to carry out a printing continuously. In such a case, in case a transition is made into a power-save status, power consumption can be reduced without increasing the time up to a printing start.

In the eighth embodiment, step S852 corresponds to the operation-completion detecting section in form 7 or 20, or the operation-completion detecting step in form 33 or 47, and step S854 corresponds to the determinable-status detecting section in form 8 or 21, or the determinable-status detecting step in form 34 or 48. Meanwhile, step S860 corresponds to the power control section in form 7, 8, 20 or 21, or the output-completion detecting section in form 7, 8, 20 or 21, the power control step in form 33, 34, 47 or 48, or the output-completion detecting step in form 33, 34, 47 or 48.

Incidentally, the fourth embodiment was configured to send a power-save transit command when deleting the print data. However, this is not limitative, i.e. it can be configured to send a power-save transit command when deleting the print data registration from the print-job management table 420. Furthermore, as in the fourth embodiment, a power-save transit command is preferably sent when determining that the print data related to a deleted registration is not registered in the print-job management table 420, instead of sending a power-save transit command on every case print data registration is deleted.

In this case, the print-job management table 420 corresponds to the index of the form 14, 15, 27, 28, 40, 41, 55, 56, 70 or 71.

Meanwhile, in the first to eighth embodiments, the network printer 300 was configured to be switched between power-save and warm-up status depending upon a power-save cancel command or a power-save transit command. However, this is not limitative, i.e. it can be configured such that, when receiving a power-save transit command during printing, the process for transition into power saving is suspended (e.g. the process command is stacked up) to execute a process to transit into a power-save move by waiting for a printing completion. In this case, the user authentication apparatus 200 is not required to determine whether or not the printing is completed based on status information.

Meanwhile, the first to eighth embodiments were configured to make an authentication by utilization of an authentication. However, this is not limitative but those can be configured to make an authentication by utilization of user's fingerprint information. In this case, a fingerprint sensor may be provided in place of the card reader 17. Naturally, other pieces of biometric information can be used in authentication.

Meanwhile, the first to eighth embodiments were configured the user authentication apparatus 200 and the network printer 300 as separate members. However, this is not limitative but those can be structured as an integral apparatus.

Meanwhile, in the first to eighth embodiments, the user authentication apparatus 200 was configured to receive status information from the network printer 300. However, this is not limitative but it can be configured to positively acquire status information by sending an acquisition request to the network printer 300.

Meanwhile, the first to eighth embodiments were configured to transmit and receive print data with print attribute information attached thereon. However, this is not limitative but those can be configured to transmit and receive print data and print attribute information separately at desired timing.

Meanwhile, the first to eighth embodiments explained on the case that the control program previously stored in the ROM 32, 52, 72 is executed in executing the process shown in the flowchart in FIGS. 3, 8, 9, 10, 12 to 21. However, this is not limitative but, from the storage medium storage a program showing those procedures, the program may be read and executed in the RAM 34, 54, 74.

Here, the storage medium includes every storage medium provided that it is a semiconductor storage medium, such as a RAM and a ROM, a magnetic-type storage medium, such as an FD and an HD, an optical-read-scheme storage medium, such as a CD, a CDV, an LD and a DVD, or a magnetic-storage-type/optical-read-scheme storage medium such as an MO, which is a storage medium to be read out by a computer regardless of whether reading is electronic, magnetic, optical.

Meanwhile, the first to eighth embodiments applied the output system, device management apparatus, device management program and output method to the case where printing is performed on the network printer 300 by utilization of an authentication card wherein the power to the network printer 300 is controlled. However, this is not limitative but application is possible to other cases within the scope not departing from the gist of the invention. In place of the network printer 300, application is possible, for example, to a projector, an electronic paper, a home gateway, a personal computer, a PDA (personal digital assistant), a network storage, an audio set, a cellular phone, a PHS (registered trademark) (Personal Handy phone System), a watch-type PDA, an STB (set top box), POS (point of sale) terminal, a FAX machine, a telephone (including an IP telephone) and other devices.

What is claimed is:

1. An output system having a network device for performing an output depending upon output data, the network device being allowed to perform an outputting upon obtaining an authentication, the output system comprising:

an output data storage section that stores the output data;

an output data saving section that saves the output data to the output data storage section;

an authentication information acquiring section that acquires authentication information;

a usability determining section that determines a usability of the output data depending on authentication information acquired at the authentication information acquiring section;

a power control section for controlling a power to the network device;

an output data transmitting section that sends, to the network device, output data which the usability determining section determined usable of among the output data of the output data storage section; and a power-save switchover section that switches over between an operating status as a power-consuming status allowing the output at the network device and a power-save status as a status lower in consuming power than the operating status;

the power control section forwarding, to the power-save switchover section, a power-save cancel command for transitioning into the operating status after the usability determining section determines the output data to be usable and before the output data transmitting section sends the output data.

2. An output system communicating between a network device for performing an output depending upon output data and a device management apparatus for managing the network device, the network device being allowed to perform an outputting upon obtaining an authentication, the output system comprising:
- an output data storage section that stores the output data;
- an output data saving section that saves the output data to the output data storage section;
- an authentication information acquiring section that acquires authentication information;
- a usability determining section that determines a usability of the output data depending on authentication information acquired at the authentication information acquiring section; and
- a power control section for controlling a power to the network device;
- the device management apparatus having an output data transmitting section that sends, to the network device, output data which the usability determining section determined usable of among the output data of the output data storage section;
- the network device having an output data receiving section that receives the output data, an output section that performs an output depending upon output data received at the output data receiving section, a power-save switchover section that switches over between an operating status as a power-consuming status allowing the output at the output section and a power-save status as a status to reduce consumed power further than the operating status;
- the power control section forwarding, to the power-save switchover section, a power-save cancel command for transitioning into the operating status after the usability determining section determines the output data to be usable and before the output data transmitting section sends the output data.

3. The output system according to claim 2, wherein the device management apparatus includes the output data saving section, the authentication information acquiring section, the usability determining section, and the power control section.

4. The output system according to claim 2, wherein the power control section forwards the power-save cancel command immediately after the usability determining section determines the output data to be usable.

5. The output system according to claim 2, wherein the output data saving section saves the output data and the authentication information, with correspondence, to the output data storage section, and
- comprising an output data retrieval section that retrieves the output data, corresponding to authentication information acquired in the authentication information acquiring section, from the output data storage section,
- the power control section forwarding the power-save cancel command when the usability determining section determines the output data to be usable and the output data retrieval section retrieved the output data.

6. The output system according to claim 2, wherein the output data saving section saves the output data and the authentication information, with correspondence, to the output data storage section, and
- comprising an output data retrieval section that retrieves the output data, corresponding to authentication information acquired in the authentication information acquiring section, from the output data storage section,
- the power control section forwarding the power-save cancel command when the usability determining section determines the output data to be usable and the output data retrieval section retrieved the output data unprocessed.

7. The output system according to claim 2, comprising an output-completion detecting section that detects a completion of an output by the output section,
- the power control section forwarding, to the power-save switchover section, a power-save transit command for transition into a power-save status when the output-completion detecting section detects a completion of the output.

8. The output system according to claim 7, comprising an operation-completion detecting section that detects a completion of an operation for the device management apparatus,
- the power control section forwarding the power-save transit command when the output completion detecting section detects a completion of the output and the operation-completion detecting section detects a completion of the operation.

9. The output system according to claim 7, comprising a determinable-status detecting section that detects that the usability determining section becomes a determinable status of usability,
- the power control section forwarding the power-save transit command when the output-completion detecting section detects a completion of the output and the determinable-status detecting section detects the determinable status.

10. The output system according to claim 2, wherein the power-save switchover section transits into a power-save status after waiting for a completion of an output by the output section when inputted with a power-save transit command for transition into a power-save status in the course of outputting by the output section,
- comprising an operation-completion detecting section that detects a completion of an operation for the device management apparatus,
- the power control section forwarding the power-save transit command to the power-save switchover section when the operation-completion detecting section detects a completion of the operation.

11. The output system according to claim 2, wherein the power-save switchover section transits into a power-save status after waiting for a completion of an output by the output section when inputted with a power-save transit command for transition into a power-save status in the course of outputting by the output section,
- comprising a determinable-status detecting section that detects that the usability determining section becomes a determinable status of usability,
- the power control section forwarding the power-save transit command to the power-save switchover section when the operation-completion detecting section detects a determinable status.

12. The output system according to claim 2, comprising an output-data deleting section that deletes the output data from the output-data storage section,
- the power control section forwards a power-save transit command for transition into a power-save status when the output-data deleting section deletes the output data.

13. The output system according to claim 12, comprising an output-data existence determining section that determines whether there is, in the output-data storage section, the output data related to the output data the output-data deleting section deleted,
- the power control section forwarding the power-save transit command when the output-data existence determining section determines a non-existence of the output data.

14. The output system according to claim 2, comprising an output-data registration deleting section that deletes a registration of the output data from an index for managing output data of the output-data storage section, the power control section forwarding, to the power-save switchover section, a power-save transit command for transition into a power-save status when the output-data registration deleting section deletes a registration of the output data.

15. The output system according to claim 14, comprising an output-data registration existence determining section for determining whether there is, in the index, a registration of the output data related to a registration the output-data registration deleting section deleted, the power control section forwarding the power-save transit command when the output-data existence determining section determines a non-existence of a registration of the output data.

16. A device management apparatus for managing a network device, the device management apparatus comprising:

an output-data saving section that saves output data to an output-data storage section;

an authentication information acquiring section that acquires authentication information;

a usability determining section that determines a usability of the output data depending upon authentication information acquired at the authentication information acquiring section;

an output-data transmitting section that sends, to the network device, output data determined usable by the usability determining section of among output data of the output-data storage section, and a power control section for controlling a power to the network device;

the power control section sending, to the network device, a power-save cancel command for transition into an operating status as a power-consuming status allowing the network device to make an output based on the output data after the usability determining section determines the output data to be usable and before sending of the output data by the output-data transmitting section.

17. A device management apparatus according to claim 16, comprising an output-completion detecting section for detecting a completion of an output by the network device, the power control section sends, to the network device, a power-save transit command for transition into a power-save status as a status lower in consuming power than the operating status when the output-completion detecting section detects a completion of the output.

18. A device management program stored on a storage medium to be executed by a computer operating as a device management apparatus for managing a network device, the program including a program for the computer to execute comprising:

saving output data in a output-data storage section;
acquiring authentication information;
determining a usability of the output data depending upon the authentication information acquired;
sending, to the network device, output data determined usable by the usability determining section of among output data in the output-data storage section; and
controlling a power to the network device;
the power control sending, to the network device, a power-save cancel command for transition into the operating status after the output data is determined usable and before sending the output data.

19. The device management program stored on a storage medium according to claim 18, including a program whose process, to be executed by the computer, comprising detecting a completion of an output by the network device, the power control sending, to the network device, a power-save transit command for transition into a power-save status when detecting a completion of the output.

20. An output method for a communicable connection provided between a network device that performs an output depending upon output data and a device management apparatus that manages the network device, the network device being allowed to perform an outputting upon obtaining an authentication, the output method including:

saving the output data in an output-data storage section;
acquiring authentication information;
determining a usability of the output data depending on the authentication information acquired; and
controlling a power to the network device;

wherein, for the device management apparatus, sending to the network device includes, output data determined usable of among output data in the output-data storage section is sent to the network device, and for the network device, receiving the output data includes, performing an output based on output data received, and switching over between an operating status as a power-consuming status allowing the output and a power-save status as a status lower in power consumption than in the operating status;

the power control forwarding a power-save cancel command for transition into the operating status after the output data is determined to be usable and before sending the output data.

21. The output method according to claim 20, including detecting a completion of the output, the power control forwarding a power-save transition command for transition into a power-save status when a completion of the output is detected.

22. A printing system having a network printer that performs a printing based on a print job, the network printer being allowed for the printing upon acquiring an authentication, the printing system comprising:

a print data storage section that stores the print data;
a print-data saving section that saves the print data to the print-data storage section;
an authentication information acquiring section that acquires authentication information;
a usability determining section that determines a usability of the print data depending upon the authentication information acquired at the authentication information acquiring section;
a power control section that controls a power to the network printer;
a print-data transmitting section that sends, to the network printer, print data determined usable by the usability determining section of among print data in the print-data storage section; and
a power-save switchover section that switches over between an operating status as a power-consuming status allowing the printing at the network printer and a power-save status as a status lower in power consumption than in the operating status;

the power control section forwarding, to the power-save switchover section, a power-save cancel command for transition into the operating status after the usability determining section determines the print data to be usable and before the print-data transmitting section sends the print data.

* * * * *